US012634868B2

(12) United States Patent
  Baek et al.

(10) Patent No.: US 12,634,868 B2
(45) Date of Patent: May 19, 2026

(54) METHOD FOR TRANSMITTING OR RECEIVING SIGNAL RELATED TO POSITIONING BY TERMINAL IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 624 days.

(21) Appl. No.: 18/025,532

(22) PCT Filed: Jun. 11, 2021

(86) PCT No.: PCT/KR2021/007305
  § 371 (c)(1),
  (2) Date: Mar. 9, 2023

(87) PCT Pub. No.: WO2022/059887
  PCT Pub. Date: Mar. 24, 2022

(65) Prior Publication Data
  US 2023/0337171 A1      Oct. 19, 2023

(30) Foreign Application Priority Data

Sep. 17, 2020   (KR) ........................ 10-2020-0119614
  Sep. 29, 2020   (KR) ........................ 10-2020-0126940
  Sep. 29, 2020   (KR) ........................ 10-2020-0126968

(51) Int. Cl.
  *H04W 64/00*        (2009.01)
  *H04L 5/00*         (2006.01)
  *H04W 72/12*        (2023.01)

(52) U.S. Cl.
  CPC ........... *H04W 64/00* (2013.01); *H04L 5/0051* (2013.01); *H04W 72/12* (2013.01)

(58) Field of Classification Search
  CPC ...... H04W 64/00; H04W 72/12; H04L 5/0051
  See application file for complete search history.

(56) References Cited

U.S. PATENT DOCUMENTS 9,964,626  B2 *   5/2018   Kim ...................... G01S 5/0063
  2009/0271101 A1 * 10/2009   Relyea ............. G08G 1/096775
                                                                701/119

(Continued)

FOREIGN PATENT DOCUMENTS

WO        2019153129 A1    8/2019
  WO        2020159312 A1    8/2020

*Primary Examiner* — Muthuswamy G Manoharan

(74) *Attorney, Agent, or Firm* — BRYAN CAVE LEIGHTON PAISNER LLP

(57)        ABSTRACT

Disclosed according to various embodiments is a method for transmitting a signal related to positioning by a first terminal in a wireless communication system supporting sidelink communication. Disclosed are a method and an apparatus, the method comprising the steps of: measuring a channel busy ratio (CBR) in a resource area preconfigured to perform positioning; transmitting a positioning packet including scheduling information for a positioning reference signal (PRS); and transmitting the PRS to neighboring terminals on the basis of the scheduling information, wherein the positioning packet includes a first threshold value related to the reliability of an absolute position for specifying a neighboring terminal which is to transmit a response PRS to the PRS, and the first threshold value is determined on the basis of the CBR.

11 Claims, 17 Drawing Sheets

(56) References Cited

U.S. PATENT DOCUMENTS

| 2017/0071007 | A1* | 3/2017 | Wang ................ H04W 28/0875 |
| 2020/0015298 | A1  | 1/2020 | Chae et al. |
| 2020/0145799 | A1* | 5/2020 | Baghel .................... H04W 4/46 |
| 2020/0145867 | A1* | 5/2020 | Tseng .................... H04L 1/0026 |
| 2022/0264583 | A1* | 8/2022 | Yang .................... H04W 4/021 |
| 2025/0142537 | A1* | 5/2025 | Freda .................... H04W 72/56 |

* cited by examiner (a)

(b)

BS (e.g. eNB or gNB)

UE1          UE2

(a)

(b)

Measuring CBR related to positioning in a
preconfigured resource region    ～S201

Transmitting a positioning packet based on
the CBR    ～S203

Transmitting a PRS based on scheduling
information    ～S205

Receiving a positioning packet — S301

Receiving a PRS based on scheduling information — S303

Determining whether to transmit
a response PRS based on a first threshold — S305

Device(100, 200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

METHOD FOR TRANSMITTING OR RECEIVING SIGNAL RELATED TO POSITIONING BY TERMINAL IN WIRELESS COMMUNICATION SYSTEM SUPPORTING SIDELINK, AND APPARATUS THEREFOR

This application is the National Stage filing under 35 U.S.C. 371 of International Application No. PCT/KR2021/007305 filed on Jun. 11, 2021, which claims priority to Korean Patent Application Nos. 10-2020-0119614 filed on Sep. 17, 2020; 10-2020-0126940 filed on Sep. 29, 2020 and 10-2020-0126968 filed on Sep. 29, 2020, the contents of which are all hereby incorporated by reference herein in their entirety.

TECHNICAL FIELD

The present disclosure relates to a method of transmitting and receiving a signal related to positioning by a user equipment (UE) based on a measured channel busy ratio (CBR) in a wireless communication system supporting sidelink and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method and apparatus for efficiently performing congestion control related to sidelink positioning by adjusting a transmission parameter of a positioning reference signal (PRS) and a target on which positioning is to be performed, based on a channel busy ratio (CBR) measured in a resource region related to positioning.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

According to an aspect of the present disclosure, provided herein is a method of transmitting a signal related to positioning by a first user equipment (UE) in a wireless communication system supporting sidelink communication, including measuring a channel busy ratio (CBR) in a resource region preconfigured to perform positioning, transmitting a positioning packet including scheduling information about a positioning reference signal (PRS), and transmitting the PRS to neighbor UEs based on the scheduling information. The positioning packet includes a first threshold related to a confidence level of an absolute position or a positioning quality indicator (PQI) for specifying a neighbor UE which is to transmit a response PRS in response to the PRS, and the first threshold may be determined based on the CBR.

The first UE may receive the response PRS from at least one neighbor UE having the confidence level of the absolute position which is equal to or greater than the first threshold.

The first UE may receive the response PRS from at least one neighbor UE having the confidence level of the absolute position which is equal to or greater than the first threshold.

The first UE may increase the first threshold in response to an increase in the CBR.

The first UE may determine a second threshold based on the CBR and transmit the positioning packet based on the confidence level of the absolute position of the first UE or the PQI of the first UE which is less than the second threshold.

The first UE may determine a second threshold based on the CBR. And, the first UE may drop transmission of the positioning packet based on the confidence level of the absolute position of the first UE or the PQI of the first UE, which is equal to or greater than the second threshold.

The first UE may determine a PRS pattern for the PRS based on the CBR.

The method may further include determining a transmission parameter for at least one of the positioning packet or the PRS based on the CBR. The transmission parameter may include at least one of a modulation and coding scheme (MCS), a transmission period, the number of repeated transmissions, and a transmit power.

The resource region for performing positioning may include a first resource region configured to transmit the positioning packet and a second resource region configured to transmit the PRS.

The first UE may measure a first CBR for the first resource region and a second CBR for the second resource region and determine a larger of the first CBR and the second CBR as the CBR.

In another aspect of the present disclosure, provided herein is a method of receiving a signal related to positioning by a second user equipment (UE) in a wireless communication system supporting sidelink, including receiving a positioning packet including scheduling information about a positioning reference signal (PRS) in a resource region preconfigured to perform positioning, receiving the PRS based on the positioning packet, and determining whether to transmit a response PRS in response to the PRS, based on the positioning packet. The positioning packet may include a first threshold determined based on a channel busy ratio (CBR) measured in the resource region, and the response PRS is transmitted based on a confidence level of an absolute position of the second UE or a positioning quality indicator (PQI) of the second UE which is equal to or greater than the first threshold.

In another aspect of the present disclosure, provided herein is a first user equipment (UE) for transmitting a signal related to positioning supporting sidelink communication, including a radio frequency (RF) transceiver; and a processor connected to the RF transceiver. The processor may be configured to measure a channel busy ratio (CBR) in a resource region preconfigured to perform positioning, and control the RF transceiver to transmit a positioning packet including scheduling information about a positioning reference signal (PRS) and transmit the PRS to neighbor UEs based on the scheduling information. The positioning packet includes a first threshold related to a confidence level of an absolute position or a positioning quality indicator (PQI) for specifying a neighbor UE which is to transmit a response PRS in response to the PRS, and the first threshold may be determined based on the CBR.

In another aspect of the present disclosure, provided herein is a second user equipment (UE) for receiving a signal related to positioning in a wireless communication system supporting sidelink, including a radio frequency (RF) transceiver, and a processor connected to the RF transceiver. The processor may be configured to control the RF transceiver to receive a positioning packet including scheduling information about a positioning reference signal (PRS) in a resource region preconfigured to perform positioning and receive the PRS based on the positioning packet, and determine whether to transmit a response PRS in response to the PRS, based on the positioning packet. The positioning packet may include a first threshold determined based on a channel busy ratio (CBR) measured in the resource region, and the response PRS is transmitted based on a confidence level of an absolute position of the second UE or a positioning quality indicator (PQI) of the second UE which is equal to or greater than the first threshold.

In another aspect of the present disclosure, provided herein is a chipset for transmitting a signal related to positioning in a wireless communication system supporting sidelink, including at least one processor, and at least one memory operably connected to the at least one processor and causing, when executed, the at least one processor to perform an operation. The operation may include measuring a channel busy ratio (CBR) in a resource region preconfigured to perform positioning, transmitting a positioning packet including scheduling information about a positioning reference signal (PRS), and transmitting the PRS to neighbor UEs based on the scheduling information. The positioning packet includes a first threshold related to a confidence level of an absolute position or a positioning quality indicator (PQI) for specifying a neighbor UE which is to transmit a response PRS in response to the PRS, and the first threshold may be determined based on the CBR.

The processor may control a driving mode of a device connected to the chipset based on the first threshold.

In another aspect of the present disclosure, provided herein is a computer readable storage medium including at least one computer program that causes at least one processor to transmit a signal related to positioning in a wireless communication system supporting sidelink. The operation may include measuring a channel busy ratio (CBR) in a resource region preconfigured to perform positioning, transmitting a positioning packet including scheduling information about a positioning reference signal (PRS), and transmitting the PRS to neighbor UEs based on the scheduling information. The positioning packet includes a first threshold related to a confidence level of an absolute position or a positioning quality indicator (PQI) for specifying a neighbor UE which is to transmit a response PRS in response to the PRS, and the first threshold may be determined based on the CBR.

According to various embodiments, a positioning reference signal (PRS) required for sidelink positioning may be transmitted by being multiplexed with a feedback signal in a limited physical sidelink feedback channel (PSFCH) resource, and the size of a frequency resource region for the PRS and a multiplexing type may be determined in consideration of the relationship with the feedback signal transmitted through a PSFCH, so that the PSFCH resource is efficiently used.

Effects to be achieved by various embodiments are not limited to what has been particularly described hereinabove and other effects not mentioned herein will be more clearly understood by persons skilled in the art to which the present disclosure pertains from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
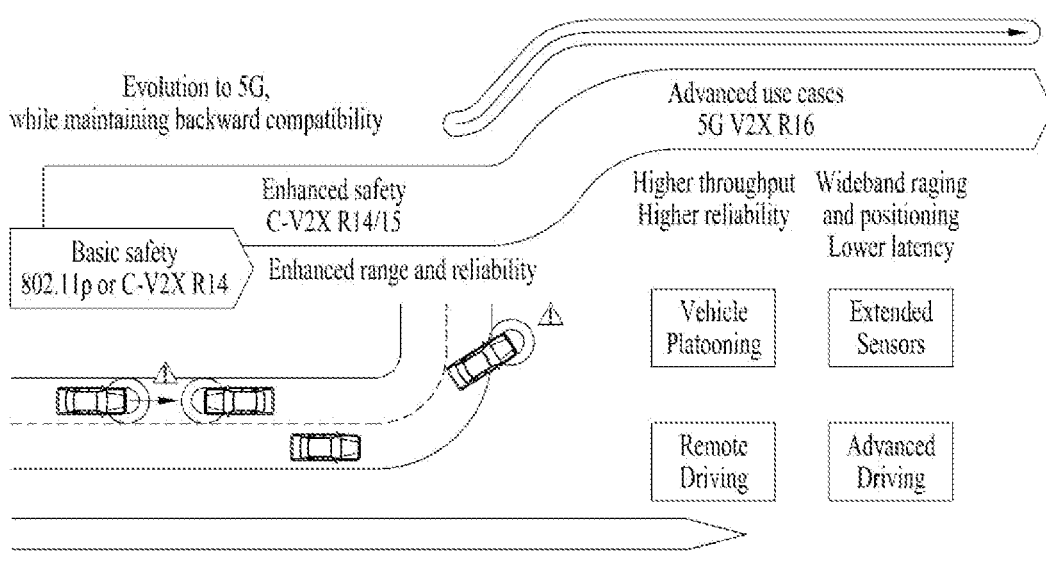
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. IEEE 802.16m is an evolution of IEEE 802.16e and provides backward compatibility with a system based on IEEE 802.16e. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
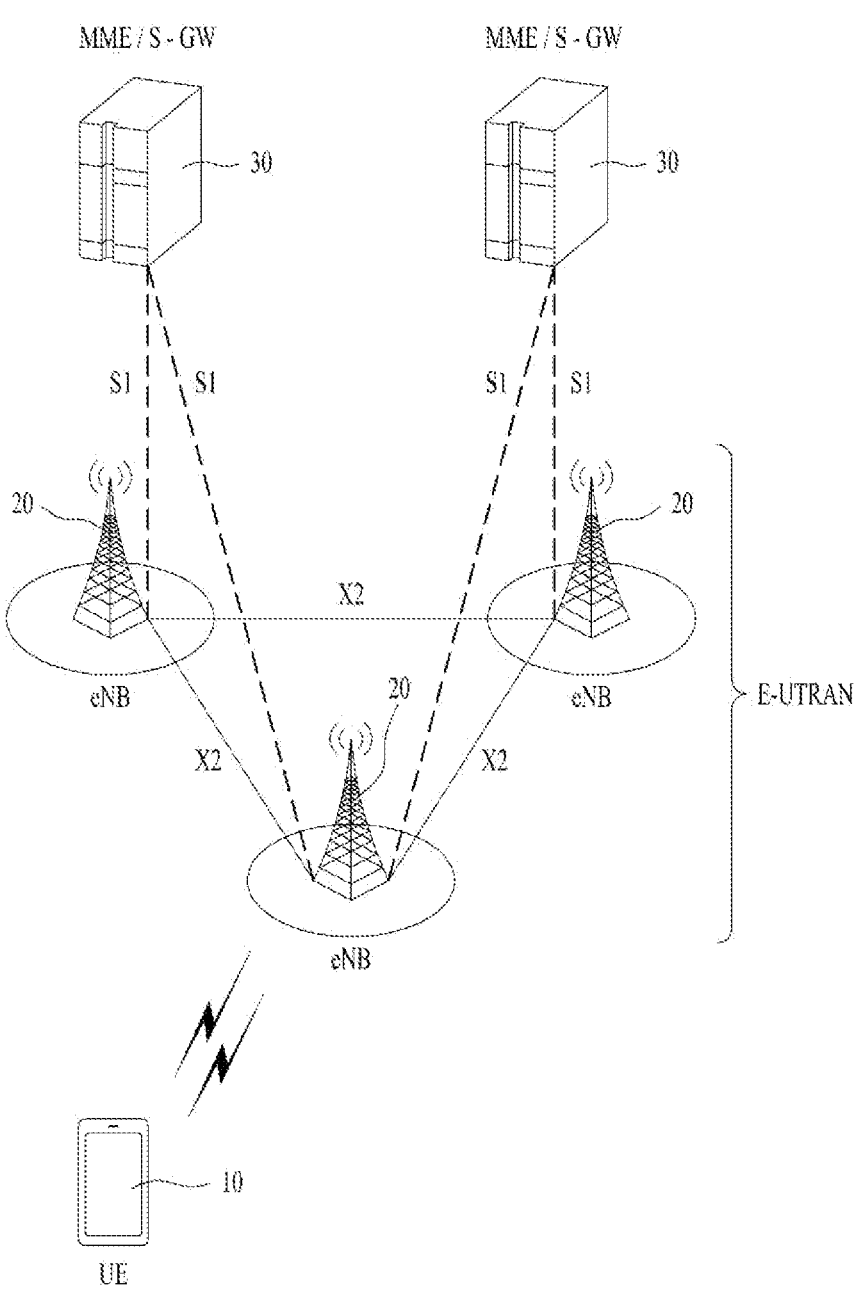
FIG. 2 illustrates the structure of an LTE system.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
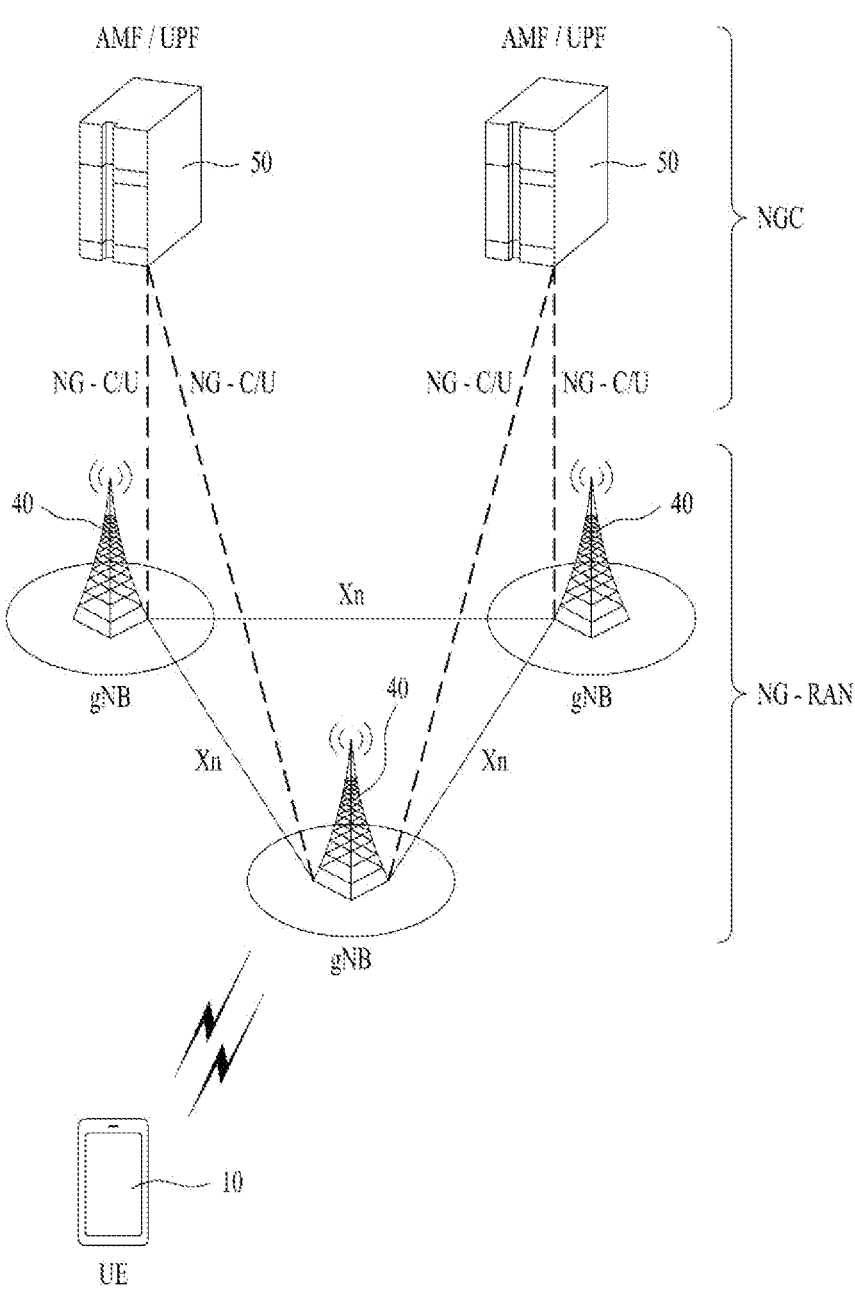
FIG. 3 illustrates the structure of an NR system.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
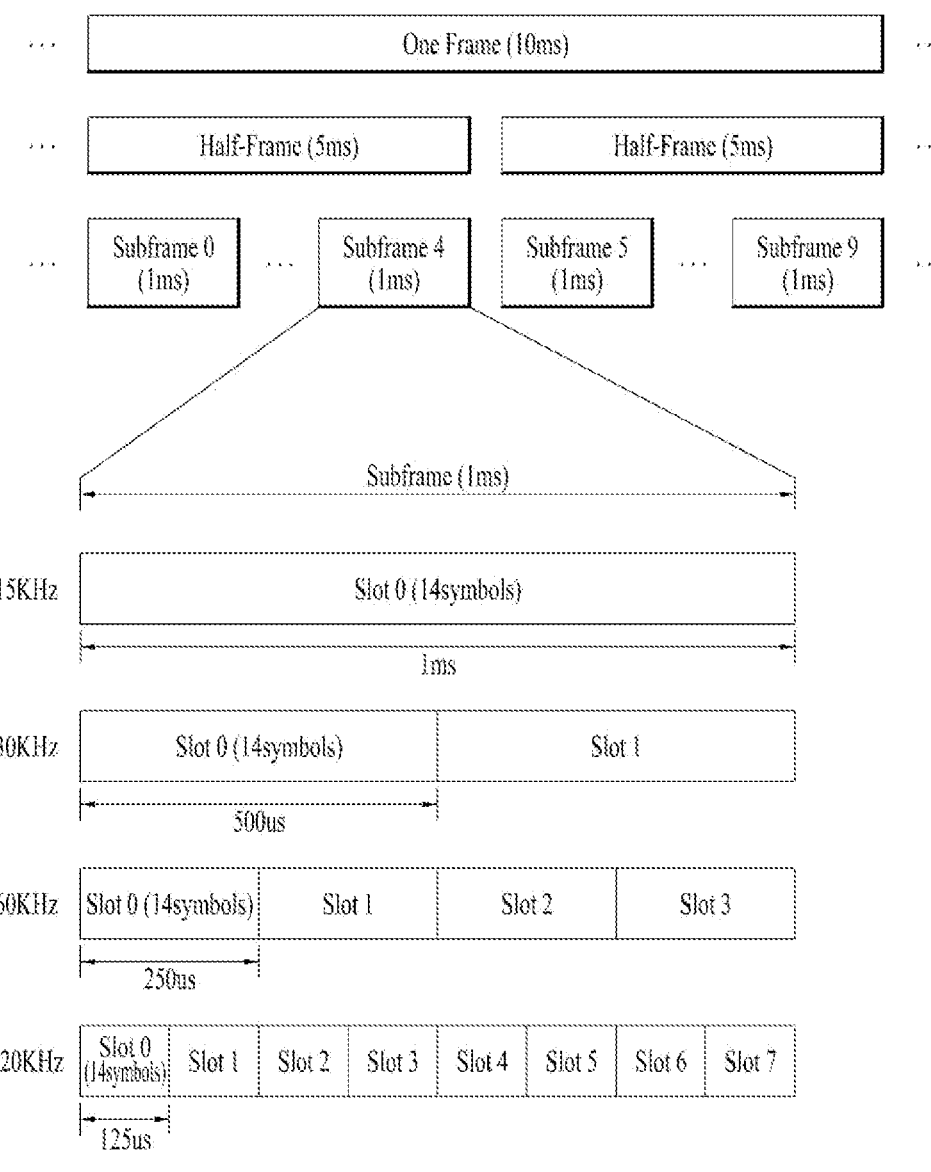
FIG. 4 illustrates the structure of an NR radio frame.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,\mu}_{slot}$), and the number of slots per subframe ($N^{subframe,\mu}_{slot}$) according to an SCS configuration $\mu$, in the NCP case.

TABLE 1

| SCS ($15*2^{\mu}$) | $N^{slot}_{symb}$ | $N^{frame, \mu}_{slot}$ | $N^{subframe, \mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^{\mu}$) | $N^{slot}_{symb}$ | $N^{frame, \mu}_{slot}$ | $N^{subframe, \mu}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6

GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
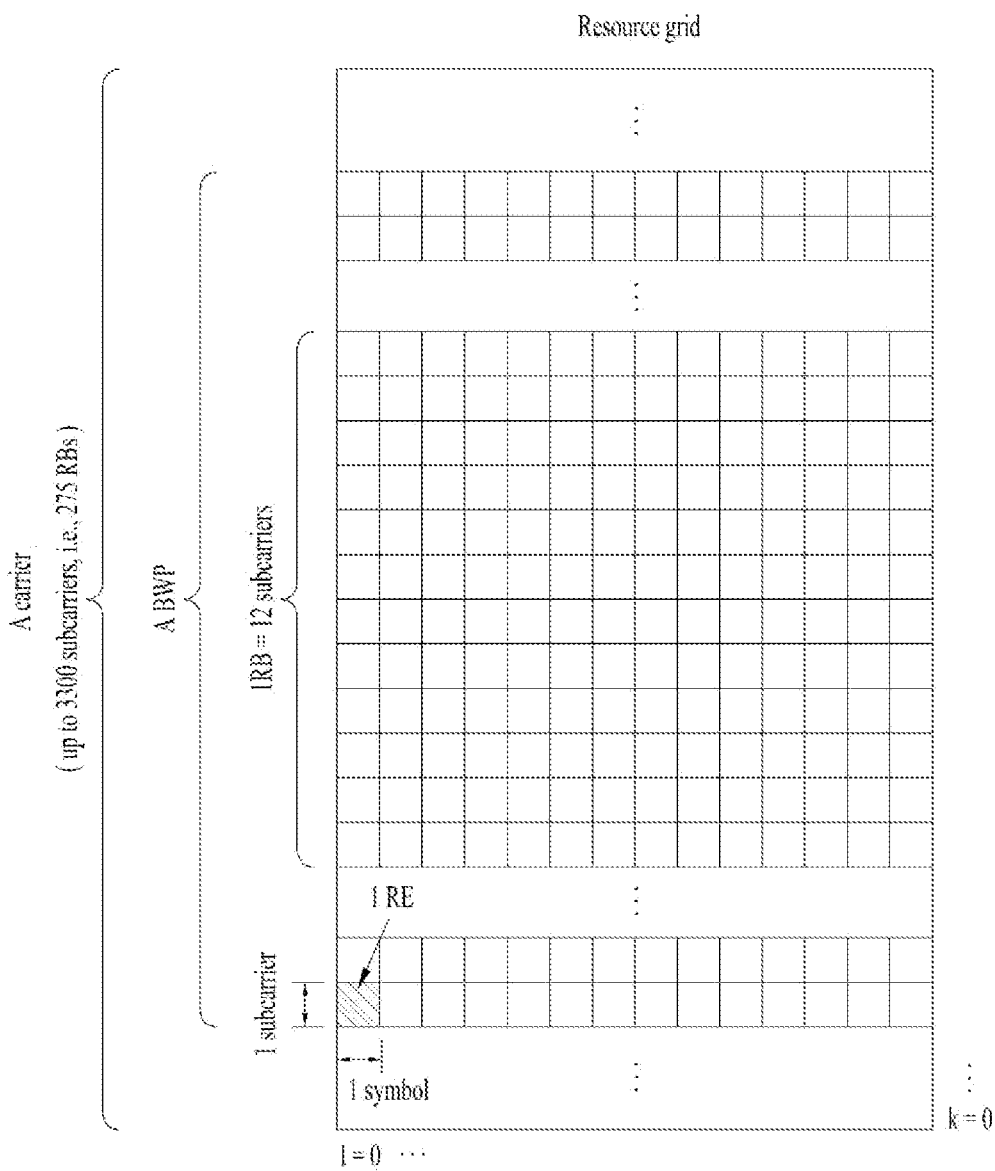
FIG. 5 illustrates the slot structure of an NR frame.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
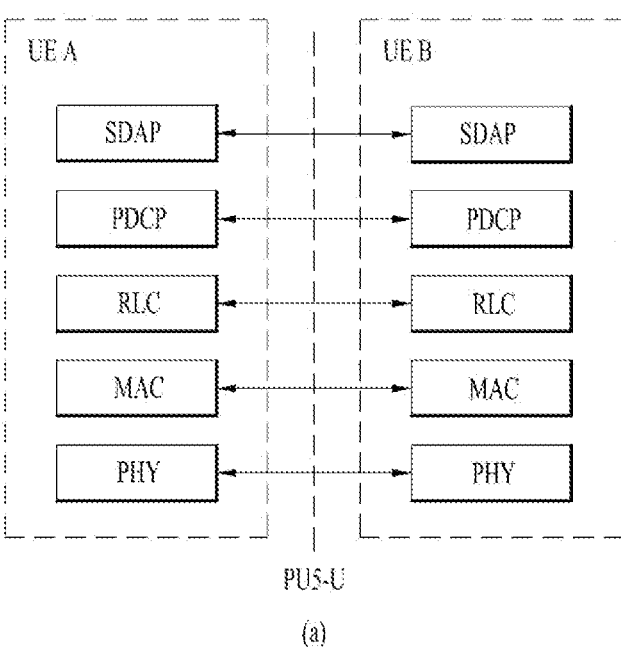
FIG. 6 illustrates a radio protocol architecture for SL communication.
Figure 6:
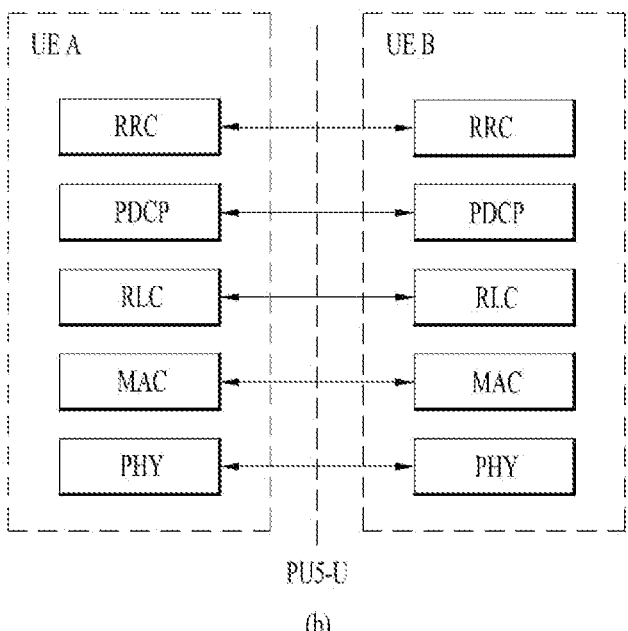

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
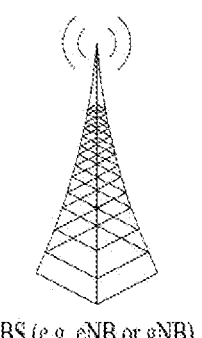
FIG. 7 illustrates UEs performing V2X or SL communication.
Figure 7:
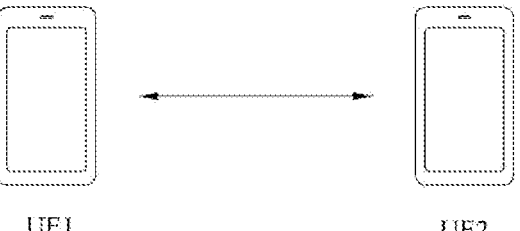

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
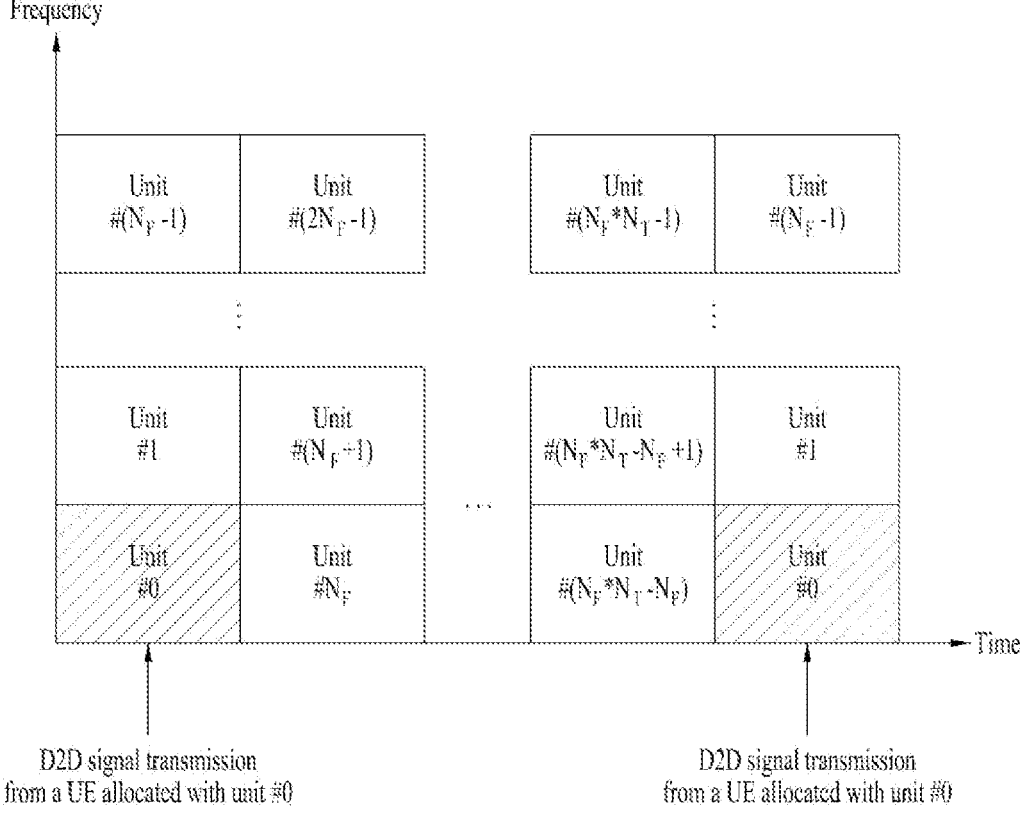
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
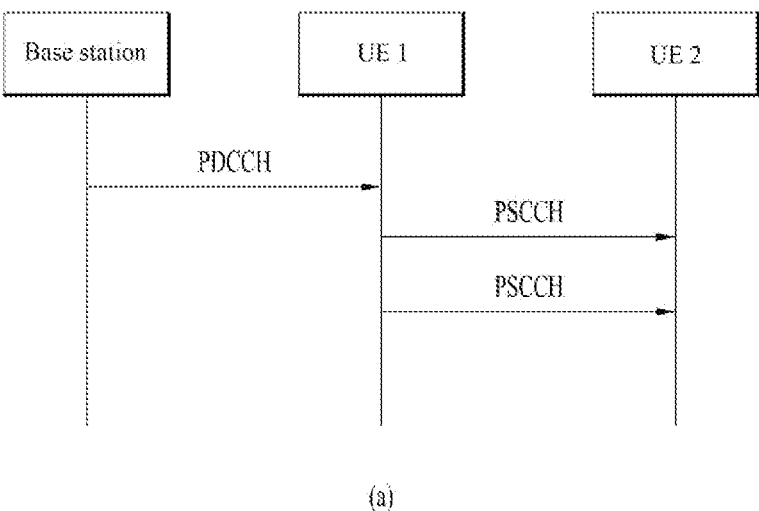
FIG. 9 illustrates a procedure in which UEs perform V2X or SL communication according to a transmission mode
Figure 9:
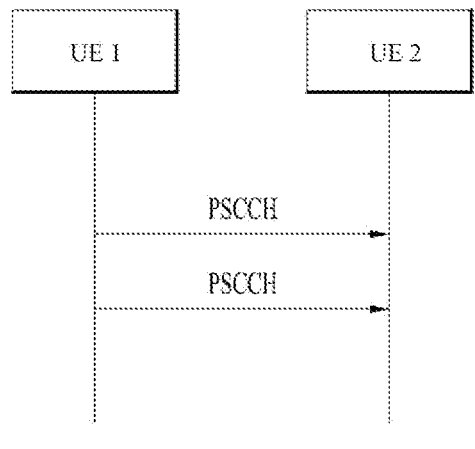

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
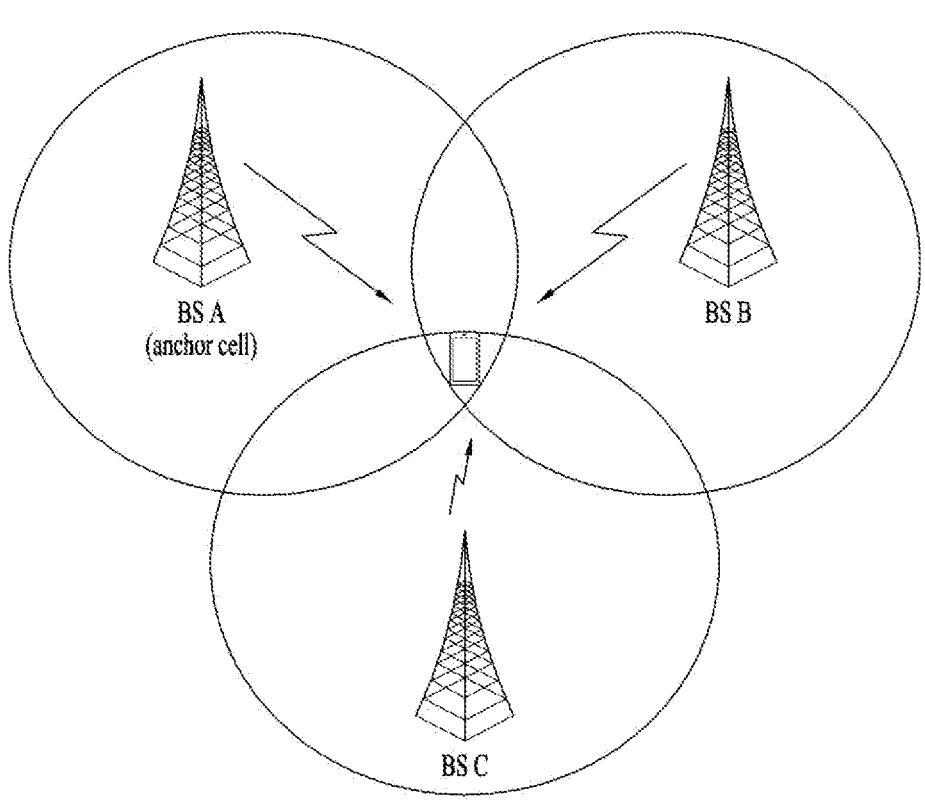
FIG. 10 illustrates an Observed Time Difference Of Arrival (OTDOA) positioning method to which the present disclosure is applicable.

FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad \text{[Equation 1]}$$

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti-T1) is a transmission time offset between the two TPs, which may be referred to as "real time difference" (RTD), and 'ni' and 'n1' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB Rx-Tx time difference, timing advance (TADV), and angle of arrival (AoA).

TADVs may be classified into Type 1 and Type 2 as follows.

TADV Type1=(ng-eNB $Rx$-$Tx$ time difference)+(UE E-UTRA $Rx$-$Tx$ time difference)

TADV Type2=ng-eNB $Rx$-$Tx$ time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Distributed Congestion Control for SL Positioning in NR-V2X Systems

Methods are proposed for solving issues that may occur due to the increased usage of channel resources for positioning allocated for SL positioning in an NR-V2X system.

Specifically, a method is proposed for effectively reducing issues related to collision between positioning packets (or packets transmitting positioning-related signaling information), collision between SL positioning reference signals (SL-PRSs), and/or interference between various packets.

In particular, each UE may perform a distributed congestion control for SL positioning (DCC-SP) method of adjusting the usage of the positioning channel resources by 1) measuring first a channel busy ratio for SL positioning (CBR-SP) for the positioning channel resources and 2) analyzing the measured degree of the CBR-SP.

In this case, the proposed CBR-SP may be 1) measured using a packet that transmits positioning-related signaling information, 2) measured using an SL-PRS, or 3) calculated using a measurement result using the packet and a measurement result using the SL-PRS, according to a structure in which the packet that transmits the positioning-related signaling information is transmitted in the NR-V2X system and to a performed positioning method.

The DCC-SP method described above may be performed by 1) adjusting the usage of the channel resources of the packet that transmits the positioning-related signaling information, 2) adjusting transmission parameters related to the SL-PRS, or 3) adjusting both the usage of the channel resources of the packet and the transmission parameters related to the SL-PRS, according to the degree of the CBR-SP and the positioning method performed by the UE.

Hereinafter, methods for effectively reducing issues related to collision between positioning packets, collision between SL-PRSs, and/or interference between various packets, that may occur due to the increased usage of the positioning channel resources allocated for SL positioning in the NR-V2X system, will be described. In particular, each UE may perform DCC-SP methods of adjusting the usage of the positioning channel resources according to a method of autonomously performing positioning after measuring a CBR-SP for the positioning channel resources. First, the terms used below will now be defined.

Positioning channel resource: A channel resource pre-allocated for a UE and an anchor node (AN) to perform SL positioning in the NR-V2X system A UE includes a vehicle, a robot, a mobile device, a V2X module, a road side unit (RSU), an IoT device, etc.

Positioning UE: A UE that performs positioning or intends to perform positioning Neighbor UE: A UE that participates in positioning A UE performing congestion control (CC) for SP (CC-SP) in an SL positioning procedure may be classified as follows according to a positioning method.

① UE performing CC-SP in UE-based SL on-demand round trip time (RTT) positioning: A positioning UE performs a CC-SP function. In contrast, a neighboring UE participating in positioning follows signaling information for CC-SP provided by the positioning UE. Alternatively, in UE-assisted SL on-demand RTT positioning, when a UE reserves positioning channel resources through a sensing process, the positioning UE may perform CC-SP.

② UE performing CC-SP in UE-based SL time difference of arrival (TDoA) positioning: A neighbor UE participating in positioning as an AN performs a CC-SP function. Alternatively, in UE-assisted SL TDoA positioning, when a UE reserves the positioning channel resource through the sensing process, the neighbor UE may perform CC-SP.

An SL-PRS includes all PRSs transmitted through SL to measure time of arrival (ToA) or time of flight (ToF) between UEs. As an embodiment, an SL-PRS for on-demand RTT positioning between UEs may include a request PRS transmitted by a positioning UE to a neighbor UE and a response PRS transmitted by the neighbor UE to the positioning UE as a response.

SL-PRS comb order: A spacing between subcarriers in which SL-PRSs are transmitted in a comb type-based SL-PRS transmission structure. The spacing between subcarriers in which SL-PRSs are transmitted is increased or incremented as the SL-PRS comb order is increased.

Message packet: A packet that transmits signaling information and data related to a V2X message Positioning packet: A packet that transmits positioning-related signaling information and includes the following packets. ① A message packet that transmits positioning-related signaling information: The positioning-related signaling information may be transmitted through PSCCH SCI and/or a PSSCH. ② A packet that transmits only positioning-related signaling information: The positioning-related signaling information may be transmitted through PSCCH SCI and/or the PSSCH.

Based on the definition of the terms described above, (1) a method of measuring a CBR-SP and (2) a method of performing DCC-SP based on the measured CBR-SP, by positioning UEs, will be described in detail.

Figure 11:
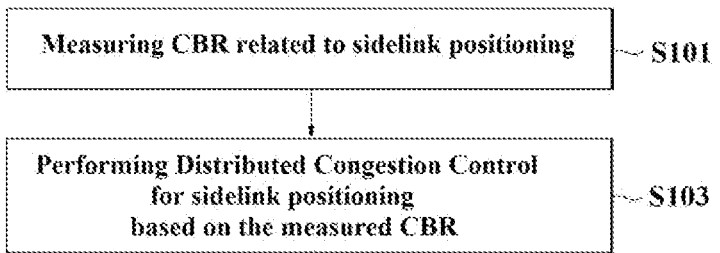
FIG. 11 is a diagram illustrating a method of performing congestion control for SL positioning (DCC-SP) in an SL positioning procedure.

FIG. 11 is a diagram illustrating a method of performing DCC-SP in an SL positioning procedure.

Referring to FIG. 11, a positioning UE may measure a CBR-SP related to a positioning resource pool preconfigured for positioning (S101).

"(1) CBR-SP measurement method" may include ① a CBR-SP measurement method based on a positioning packet, ② a CBR-SP measurement method using an SL-PRS, and ③ a CBR-SP measurement method based on a combination of the above two methods. First, the CBR-SP measurement method related to the positioning packet may be performed through received signal strength indicator (RSSI) measurement for a received positioning packet and reference signal received power (RSRP) measurement for a DMRS of the positioning packet. The CBR-SP measurement method using the SL-PRS may be performed through RSRP measurement for the SL-PRS. In particular, CBR-SP measurement using the SL-PRS may be effectively used in a positioning system in which one UE transmits two or more SL-PRSs. In addition, a CBR-SP may be obtained using a CBR-SP measured using the positioning packet and a CBR-SP measured using the SL-PRS.

Hereinafter, the CBR-SP measurement method performed by each UE will first be described prior to DCC-SP.

(1) CBR-SP Measurement Method Using Positioning Packet

1) Positioning packet transmission structure: The CBR-SP measurement method using the positioning packet may be applied to the following structure in which the positioning packet is transmitted.

① A structure in which the positioning packet is transmitted through a determined subchannel in an existing V2X message transmission slot or a structure in which the positioning packet is transmitted through a preconfigured subchannel in the existing V2X message transmission slot or in a V2X message transmission slot for positioning packet transmission provided through a master information block (MIB)/system information block (SIB) by a BS or through a subchannel in the V2X message transmission slot, ② a structure in which the positioning packet is transmitted through a positioning dedicated slot (which may be provided through PSCCH SCI) distinguished from the existing V2X message transmission slot.

2) CBR-SP measurement: Identical or similar to a CBR measurement method which has been used in a V2X message transmission system, the CBR-SR may be calculated by calculating the ratio of subchannels for which received powers exceed a threshold to the total number of allocated subchannels after measuring received powers for subchannels allocated for positioning packet transmission during a certain observation period from a past certain time point to a current time point. Here, measurement of a received power in a subchannel (or determination as to whether to use a subchannel) may be performed through measurement of RSSI for the positioning packet and/or measurement of RSRP for a DMRS. In addition, the threshold for a received power may be predefined or received from the BS.

(2) CBR-SP Measurement Method Using PRS

1) Positioning packet transmission structure: The CBR-SP measurement method using the SL-PRS may be applied to the following structures in which the positioning packet is transmitted.

① A structure in which the positioning packet is transmitted through a determined subchannel in the existing V2X message transmission slot ② A structure in which the positioning packet is transmitted through an arbitrary subchannel in the existing V2X message transmission slot: If a subchannel through which the positioning packet is transmitted is not previously allocated and designated, it is difficult to apply the CBR-SP measurement method using the positioning packet. Therefore, in such a positioning packet transmission structure, CBR-SP measurement may be performed using the SL-PRS.

③ A structure in which the positioning packet is transmitted through a positioning dedicated slot that is distinguished from the existing V2X message transmission slot ④ A structure in which information related to different SL-PRSs transmitted through multiple antennas is transmitted through one positioning packet in a system performing positioning using distributed antennas Meanwhile, CBR-SP measurement using the positioning packet may not be sufficient to measure an SL-PRS usage rate and, in this case, CBR-SP measurement using the SL-PRS may be additionally required.

2) The CBR-SP measurement method using the SL-PRS may be applied to the following SL-PRS transmission structures.

① A structure in which the SL-PRS is transmitted through a determined SL-PRS pool in the existing V2X message transmission slot ② A structure in which the SL-PRS is transmitted through an SL-PRS pool of a positioning dedicated slot that is distinguished from the existing V2X message transmission slot ③ A structure in which the SL-PRS is transmitted through an SL-PRS dedicated slot that is distinguished from the existing V2X message transmission slot 3) CBR-SP measurement Identical or similar to the CBR measurement method used in the V2X message transmission system, the CBR-SR may be calculated by calculating the ratio of SL-PRSs for which received powers exceed a threshold to the total number of allocated SL-PRSs after measuring the RSRPs of different SL-PRSs transmitted in a PRS pool during a certain observation period from a past certain time point to a current time point.

(3) CBR-SP Measurement Method Using a Measurement Result Using the Above-Described Positioning Packet and a Measurement Result Using the Above-Described SL-PRS CBR-SP measurement using the positioning packet and CBR-SP measurement using the SL-PRS may be simultaneously performed. CBR-SP measurement using the positioning packet may be preferentially used over CBR-SP measurement using the SL-PRS. Alternatively, a higher CBR-SP value among CBR-SP measurement using the positioning packet and CBR-SP measurement using the SL-PRS is selected as a final CBR-SP.

Next, the positioning UE may perform DCC-SP based on the measured CBR-SP (S103).

The DCC-SP method may be performed, depending on the positioning method performed by the UE, by (1) adjusting the usage of positioning channel resources of a packet that transmits positioning-related signaling information, (2) adjusting transmission parameters related to the SL-PRS, or (3) adjusting both the usage of the positioning channel resources of the packet and the transmission parameters related to the SL-PRS.

(1) A Method of Adjusting the Usage of the Positioning Channel Resources of the Packet that Transmits the Positioning-Related Signaling Information A DCC-SP method through adjustment of the usage of the positioning channel resources of the positioning packet may include DCC-SP through adjustment of a modulation order for signaling information and data of the positioning packet, DCC-SP through adjustment of the amount of data of the positioning packet, DCC-SP through adjustment of the transmission period of the positioning packet (as the transmission period of the positioning packet is associated with the transmission period of the SL-PRS, if the transmission period of the positioning packet changes, the transmission period of the SL-PRS also changes), SCC-SP through adjustment of the number of transmissions of the positioning packet (if the number of transmissions of the positioning packet changes, the number of transmissions of the SL-PRS also changes), DCC-SP through positioning packet dropping, DCC-SP through adjustment of the transmit power of the positioning packet, and DCC-SP through adjustment of the maximum number of UEs participating in positioning (DCC-SP may be performed by adjusting the maximum number of positioning UEs or the maximum number of neighbor UEs serving as an AN, according to a positioning method).

1) A DCC-SP method through adjustment of a modulation order for signaling information and data of the positioning packet When a CBR-SP is high, the size of a transmitted packet may be reduced by increasing the modulation order for the positioning packet, and furthermore, the size of a subchannel for positioning packet transmission and the usage of the positioning channel resources may be reduced. Such DCC-SP may be differently applied as follows according to a structure in which the positioning-related signaling information is transmitted.

Specifically, ① in a structure in which only the positioning-related signaling information is transmitted (i.e., when a dedicated slot structure for positioning is allocated), DCC-SP through adjustment of the modulation order may be easily applied. In contrast, ② in a structure in which the positioning-related signaling information is transmitted through an existing V2X message packet, it may not be easy to apply DCC-SP through adjustment of the modulation order only for the positioning-related signaling information, and DCC-SP through adjustment of the modulation order for all positioning packet data may be applied or DCC-SP through adjustment of the modulation order may not be applied.

2) DCC-SP through adjustment of the amount of data of the positioning packet

When a UE transmits/reports an absolute position thereof and measurements to neighbor UEs, the amount of transmitted data may be adjusted through adjustment of granularity (or bit-size) of the reported information. In this case, the granularity may be adjusted according to the speed and/or service type of the UE.

3) DCC-SP through adjustment of the transmission period of the positioning packet The transmission period of the positioning packet is associated with the transmission period of the SL-PRS, and therefore, when the transmission period of the positioning packet changes, the transmission period of the SL-PRS also changes.

Specifically, when the CBR-SP is high, the usage of the positioning channel resources may be reduced by increasing the transmission period of the positioning packet. However, in this case, positioning performance degradation may occur. When the CBR-SP is low, the transmission period of the positioning packet may be shortened, and in this case, positioning performance may be improved. Meanwhile, in this case, the usage of the positioning channel resources may increase.

4) DCC-SP through adjustment of the number of transmissions of the positioning packet When the number of transmissions of the positioning packet changes, the number of transmissions of the SL-PRS also changes.

Specifically, when the CBR-SP is high, the usage of the positioning channel resources may be reduced by reducing the number of transmissions of the positioning packet. In this case, positioning performance degradation may occur. Alternatively, when the CBR-SP is low, positioning performance may be improved by increasing the number of transmissions of the positioning packet. However, the usage of the positioning channel resources increases.

5) DCC-SP through positioning packet dropping

When the CBR-SP is high, the usage of the positioning channel resource may be reduced by not transmitting the positioning packet reserved for transmission. In this case, positioning performance degradation may occur. Alternatively, when CBR-SP is low, a positioning packet dropping operation is not performed.

6) DCC-SP through adjustment of the transmit power of the positioning packet

When the CBR-SP is high, the usage of the positioning channel resources may be reduced by reducing power for positioning packet transmission. Meanwhile, the number of ANs participating in positioning may be reduced, and thus, positioning performance degradation may occur. Alternatively, when the CBR-SP is low, power for positioning packet transmission may be increased within a maximum allowed power, maintained at a previous power value, set to a default value, or set to the maximum allowed power.

7) DCC-SP through adjustment of the maximum number of UEs participating in positioning (or the number of positioning packets)

The number of UEs participating in positioning may be differently adjusted according to a positioning method. That is, DCC-SP may be performed by adjusting the number of positioning UEs and/or the number of neighbor UEs serving as ANs.

First, a method of adjusting the maximum number of UEs participating in positioning will be described through an embodiment considering UE-based SL on-demand RTT positioning. That is, a method of reducing the total usage of the positioning channel resources used to perform RTT positioning by adjusting the number of positioning UEs may be applied.

Specifically, the positioning UE does not perform positioning if a positioning quality indicator (PQI) and/or a confidence level of an absolute position before performing positioning is equal to or greater than a predetermined threshold. Considering this, the threshold may be adjusted (or calculated) based on a CBR-SP. The positioning UE may adjust the threshold based on the CBR-SP (according to a preconfigured equation), adjust the threshold based on a predefined or preset applicable reference value for each CBR-SP degree/level, or adjust a threshold by obtaining the threshold corresponding to the CBR-SP through a BS or an RSU.

For example, when the CBR-SP is high, the positioning UE or the RSU may reduce the threshold based on the CBR-SP to perform positioning only when a confidence level of an absolute position is lower than the adjusted threshold. In other words, the number of UEs which are to perform positioning may be effectively reduced by decreasing the threshold according to an increase in the CBR-SP.

Alternatively, the total usage of the positioning channel resources used to perform RTT positioning may be reduced by adjusting the maximum number of neighbor UEs participating in performing RTT positioning.

That is, the total usage of the positioning channel resources may be reduced by adjusting the maximum number of neighbor UEs participating in positioning through a process of distributing the positioning channel resources for neighbor UEs. For example, when the CBR-SP is high, the positioning UE may reduce the total usage of the positioning channel resources used for RTT positioning by reducing the maximum number of neighbor UEs participating in positioning. In this case, the maximum number of neighbor UEs participating in positioning may be adjusted (or calculated) according to the CBR-SP through the following methods.

Specifically, the positioning UE may determine the maximum number of UEs participating in performing RTT, corresponding to an autonomously measured CBR-SP. Alternatively, the maximum number of UEs corresponding to the degree/level of the CBR-SP may be preset or predefined. Alternatively, the maximum number corresponding to the measured CBR-SP may be obtained through the BS or the RSU.

Alternatively, through an embodiment considering UE-based SL TDoA positioning, the usage of the positioning channel resources may be reduced by adjusting the maximum number of UEs participating in positioning. Specifically, a neighbor UE may participate in TDoA positioning as an AN only when the PQI or confidence level of an absolute position thereof is equal to or greater than a predetermined threshold. In other words, the AN participating in positioning according to a TDoA request of the positioning UE may be limited to a neighbor UE having the confidence level or PQI equal to or greater than a specific threshold.

In this case, the threshold may be adjusted (or calculated) according to the CBR-SP through the following method.

The positioning UE may calculate or determine a threshold corresponding to the autonomously measured CBR-SP. Alternatively, the threshold corresponding to the degree/level of CBR-SP may be preset or predefined. Alternatively, the threshold corresponding to the measured CBR-SP may be obtained through the BS or the RSU.

For example, as an embodiment of a threshold adjustment method, when the CBR-SP is high, the positioning UE may transmit a positioning packet including a threshold greater than an existing threshold to reduce the number of neighbor UEs which are to participate in positioning according to the positioning packet.

Alternatively, at least one AN among fixed ANs such as a plurality of RSUs may not participate in a positioning request of the positioning UE when the measured CBR-SP is greater than or equal to a specific threshold. Here, the at least one AN may be predefined or preconfigured.

DCC-SP may be performed through at least two of methods 1) to 7) described above. For example, when the measured CBR-SP is greater than or equal to a specific threshold, the positioning UE may reduce the number of transmissions of the positioning packet while increasing a threshold related to the PQI or confidence level.

(2) DCC-SP Method Through Adjustment of the Transmission Parameters Related to the SL-PRS The DCC-SP method through adjustment of the transmission parameters related to the SL-PRS may include DCC-SP through adjustment of an SL-PRS comb order, DCC-SP through adjustment of the transmission period of the SL-PRS, DCC-SP through adjustment of the number of transmissions of the SL-PRS, DCC-SP through SL-PRS dropping (SL-PRS dropping is a method of not transmitting the SL-PRS reserved for transmission and may be applied to a positioning system using a single antenna and a positioning system using distributed antennas. In particular, SL-PRS dropping in the system using the distributed antennas includes the case in which an antenna reserved for SL-PRS transmission does not transmit the SL-PRS), DCC-SP through adjustment of the transmit power of the SL-PRS, DCC-SP through adjustment of the number of repeated transmissions of consecutive SL-PRSs, and DCC-SP through adjustment of transmission bandwidth of the SL-PRS.

1) DCC-SP through adjustment of an SL-PRS comb order

When the CBR-SP is high, the positioning UE may reduce the usage of the positioning channel resources for one SL-PRS transmission within a PRS pool by increasing the SL-PRS comb. That is, the total number of SL-PRSs capable of being transmitted in the PRS pool may be increased by increasing the SL-PRS comb order. Such a DCC-SP method may be effectively associated with the above-described DCC-SP method through adjustment of the modulation order for the signaling information and data of the positioning packet. Alternatively, when the CBR-SP is low, the positioning UE may improve positioning performance by reducing the SL-PRS comb order. In this case, the usage of the positioning channel resources increases.

2) DCC-SP through adjustment of the transmission period of the SL-PRS

The transmission period of the SL PRS is linked to the transmission period of the positioning packet. In this case, when the transmission period of the positioning packet changes, the transmission period of the SL-PRS also changes. Specifically, when the CBR-SP is high, the positioning UE may reduce the usage of the positioning channel resources by increasing the transmission period of the SL-PRS. In this case, positioning performance degradation may occur. Alternatively, when the CBR-SP is low, the positioning UE may improve positioning performance by shortening the transmission period of the SL-PRS. In this case, the usage of the positioning channel resources may increase.

3) DCC-SP through adjustment of the number of transmissions of the SL-PRS

When the number of transmissions of the positioning packet changes, the number of transmissions of the SL-PRS also changes. Specifically, when the CBR-SP is high, the positioning UE may reduce the number of transmissions of the positioning channel resource by reducing the number of transmissions of the SL-PRS. In this case, positioning performance degradation may occur. Alternatively, when the CBR-SP is low, the positioning UE may improve positioning performance by increasing the number of transmissions of the SL-PRS. In this case, the usage of the positioning channel resource increases.

4) DCC-SP through SL-PRS dropping

SL-PRS dropping is a method of not transmitting the SL-PRS reserved for transmission and may be applied to a positioning system using a single antenna and a positioning system using distributed antennas. In particular, SL-PRS dropping in the system using the distributed antennas includes the case in which the SL-PRS is not transmitted in an antenna reserved for SL-PRS transmission. Specifically, when the CBR-SP is high, the positioning UE may reduce the usage of the positioning channel resources by not transmitting the SL-PRS reserved for transmission. In this case, positioning performance degradation may occur. Alternatively, when the CBR-SP is low, the SL-PRS dropping operation is not performed.

5) DCC-SP through adjustment of the transmit power of the SL-PRS

When the CBR-SP is high, the positioning UE may reduce the usage of the positioning channel resources by reducing the transmit power for the SL-PRS. In this case, the number of ANs participating in positioning may be reduced, and thus positioning performance may be deteriorated. Alternatively, when the CBR-SP is low, the positioning UE may increase the transmit power of the SL-PRS within a maximum allowed power, maintain a previous power value, set the transmit power of the SL-PRS to a default value, or set the transmit power of the SL-PRS to the maximum allowed power.

6) DCC-SP through adjustment of the number of repeated transmissions of consecutive SL-PRSs When the CBR-SP is high, the positioning UE may reduce the usage of the positioning channel resources by reducing the number of repeated transmissions of consecutive SL-PRSs. In this case, positioning performance degradation may occur. Alternatively, when the CBR-SP is low, the positioning UE may improve positioning performance by increasing the number of repeated transmissions of consecutive SL-PRSs. In this case, the usage of the positioning channel resources may increase.

7) DCC-SP through adjustment of the transmission bandwidth of the SL-PRS

When the CBR-SP is high, the usage of the positioning channel resources may be reduced by reducing the transmission bandwidth of the SL-PRS. In this case, positioning performance degradation may occur. Alternatively, when the CBR-SP is low, positioning performance may be improved by increasing the transmission bandwidth of the SL-PRS. In this case, the usage of the positioning channel resources may increase.

As described above, positioning UEs may use or apply at least one of the above-described DCC-SP methods for adjusting the usage of the positioning channel resources according to the positioning method performed after measuring the CBR-SP for the positioning channel resources.

In addition, DCC-SP may be performed by simultaneously applying the method of adjusting the usage of the positioning channel resources of the packet and the method of adjusting the transmission parameters related to the SL-PRS. For example, the positioning UE may apply or use at least two methods of "(1)" to "(3)" to perform DCC-SP.

Figure 12:
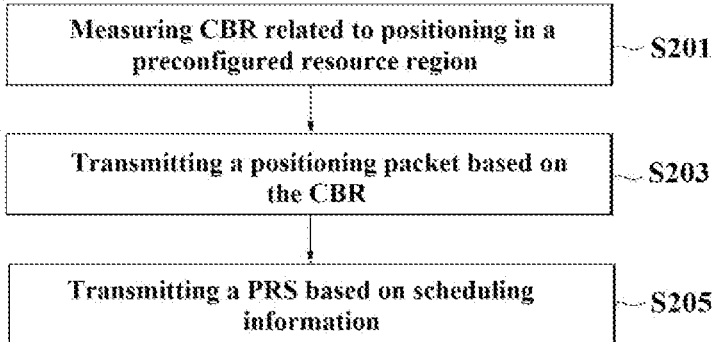
FIG. 12 is a diagram illustrating a method of performing positioning based on a channel busy ratio (CBR) in a resource region configured for SL positioning.

FIG. 12 is a diagram illustrating a method of performing positioning based on a CBR in a resource region configured for SL positioning.

Referring to FIG. 12, a first UE, i.e., a positioning UE, may measure a CBR based on a positioning packet and/or a PRS received in a resource region preconfigured for positioning (S201). As described above, the preconfigured resource region may be a partial region of the resource pool configured for V2X communication or the dedicated resource pool separately configured for SL positioning. Here, the CBR corresponds to the aforementioned CBR-SP.

Alternatively, the preconfigured resource region may include a first resource region for the positioning packet and a second resource region for transmission of the PRS. In this case, the first UE may measure a first CBR for the first resource region and a second CBR for the second resource region. The first UE may determine the larger of the first CBR and the second CBR as a reference CBR for congestion control. Alternatively, the first UE prioritizes the first CBR to determine the first CBR as the reference CBR. However, when the number of positioning packets of other UEs received in the first resource region is less than a preset reference number, the first UE may determine the second CBR as the reference CBR. Alternatively, the first UE may determine the reference CBR based on the first CBR to which a first weight is applied and the second CBR to which a second weight is applied, and the first weight may be a value greater than the second weight. Hereinafter, the reference CBR may be expressed as the CBR.

Alternatively, the first UE may perform independent congestion control based on each of the first CBR and the second CBR. Specifically, the first UE may perform congestion control for the positioning packet based on the first CBR and perform congestion control for the PRS based on the second CBR.

Next, the first UE may transmit the positioning packet including scheduling information for a PRS based on the measured CBR (S203). As described above, the first UE may determine transmission parameters of the positioning packet based on the CBR (or the first CBR) and transmit the positioning packet according to the determined transmission parameters. For example, the first UE may determine an MCS, the transmission period, the number of repeated transmissions, and/or a transmit power for the positioning packet, based on the CBR, and transmit the positioning packet based on the determined transmission parameters. Alternatively, the first UE may report the measured CBR to the BS or the RSU, and transmission parameters corresponding to the measured CBR may be configured by the BS and the RSU.

Alternatively, the first UE may transmit the positioning packet including a first threshold determined differently according to the measured CBR. Here, the first threshold is a value for specifying neighbor UEs which are to participate in positioning based on the positioning packet and is a reference value of a confidence level of an absolute position of a neighbor UE capable of participating in positioning. In this case, the first UE may receive a positioning related signal (e.g., a response PRS) corresponding to the positioning packet only from neighbor UEs having a confidence level of an absolute position higher than the first threshold.

Specifically, the first threshold may be preconfigured to correspond to the CBR value. For example, the first threshold may be preconfigured as a first value in a first CBR range and as a second value in a second CBR range. When the first CBR range is wider than the second CBR range, the first value may be preconfigured as a value larger than the second value.

Alternatively, the first UE may determine the first threshold as a first value or a second value based on whether the measured CBR is greater than or equal to a preset reference value. Specifically, the first UE may set the first threshold to the first value when the measured CBR is greater than or equal to the preset reference value and to the second value when the measured CBR is less than the preset reference value. In this case, the first threshold may be preset to a value greater than the second value.

As such, the first threshold may be determined as a large value when the CBR increases, and the first UE may transmit a positioning packet including the first threshold. In this case, the first UE may effectively reduce congestion due to an increase in the CBR by reducing the number of neighbor UEs which are to participate in positioning of the first UE.

Alternatively, the first UE may determine whether to transmit the positioning packet based on the measured CBR. Specifically, the first UE may determine the second threshold based on the measured CBR. The first UE may set or determine the second threshold corresponding to the CBR, and the second threshold may be preset to a smaller value as the CBR increases. In this case, the first UE may calculate or obtain a confidence level or PQI of an absolute position thereof and transmit the positioning packet when the confidence level or PQI of the absolute position thereof is less than the second threshold. Alternatively, when the confidence level of the absolute position of the first UE is equal to or greater than the second threshold, the first UE may drop transmission of the positioning packet.

That is, when the CBR is greater than or equal to a specific reference value, the first UE may reduce the number of positioning UEs capable of transmitting the positioning packet by decreasing the second threshold. Therethrough, a congestion level in a positioning resource region may be controlled.

Next, the first UE may transmit a corresponding PRS to neighbor UEs according to scheduling information included in the positioning packet (S205). In this case, the first UE may receive a response PRS to the PRS from a neighbor UE having a confidence level of an absolute position higher than the first threshold among neighbor UEs.

Alternatively, the first UE may determine a transmission parameter and/or a PRS pattern for the PRS based on the CBR (or the second CBR) similarly to the positioning packet. The first UE may transmit the PRS based on the determined transmission parameter and/or PRS pattern for the PRS. For example, the first UE may adjust a comb order of the PRS pattern based on the CBR. When the CBR is greater than or equal to a predetermined reference value, the first UE may increase a spacing between the PRSs (the number of null subcarriers) by increasing the comb order of the PRS pattern. In this case, the first UE may decrease the ratio of PRS occupancy within one subchannel by increasing the comb order of the PRS pattern.

Figure 13:
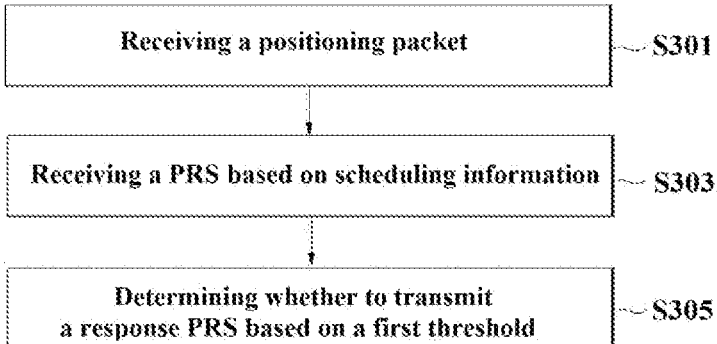
FIG. 13 is a diagram illustrating a method for receiving a signal related to positioning by a second UE.

FIG. 13 is a diagram illustrating a method for receiving a signal related to positioning by the second UE.

Referring to FIG. 13, the second UE may receive a positioning packet from the first UE (S301). The second UE may obtain scheduling information of a PRS related to positioning, a PRS pattern (or a PRS ID), and a first threshold, based on the positioning packet.

Alternatively, the second UE may determine whether to participate as an AN in positioning of the first UE according to the positioning packet based on the first threshold. Here, the first threshold may correspond to a reference value related to the confidence level of an absolute position as described above, and the second UE may operate as the AN in performing positioning of the first UE when the confidence level of an absolute position of the second UE is equal to or greater than the first threshold.

Meanwhile, as described above, the first threshold may be a value differently set according to a CBR measured in the first UE.

Next, the second UE may receive the PRS transmitted by the first UE based on the scheduling information of the PRS (S303). The second UE may generate information about a reception time necessary for positioning based on the received PRS. Alternatively, the second UE may not receive the PRS according to the scheduling information of the PRS when the confidence level or PQI of the absolute position thereof is lower than the first threshold.

Next, the second UE may determine whether to transmit a response PRS in response to the received PRS based on the first threshold (S305). The second UE may transmit the response PRS to the first UE when the confidence level or PQI of the absolute position thereof is greater than or equal to the first threshold. Unlike this, the second UE does not transmit the response PRS to the first UE when the confidence level or PQI of the absolute position thereof is less than the first threshold. That is, the second UE may transmit the response PRS only when the confidence level of the absolute location thereof is greater than or equal to the first threshold.

Alternatively, the second UE may measure a CBR for a resource region related to positioning and determine whether to participate in positioning of the first UE based on the measured CBR. The second UE may preconfigure a first threshold corresponding to each CBR and set or determine the first threshold corresponding to the measured CBR. In this case, the second UE may operate as an AN in positioning for the first UE or transmit the response PRS when the confidence level or PQI thereof is equal to or greater than the first threshold.

Centralized Congestion Control for SL Positioning

In the NR-V2X system, issues related to collision between positioning packets (or packets that transmit positioning-related signaling information), collision between SL-PRSs, and/or interference between various packets, that may be caused due to an increase in the usage of positioning channel resources allocated for SL positioning, may be effectively reduced with the help/support of a central control unit.

That is, DCC-SP for solving the above-described issues may be performed not by a positioning UE but by the central control unit (i.e., a reference UE, an RSU, or a BS) and be transferred to the positioning UE. This method may be defined as a centralized congestion control (CCC)-SP method, and the above-described proposals for DCC-SP may also be applied to CCC-SP.

Specifically, the central control unit may include a BS (gNB/eNB), an RSU, or a cluster header. Mainly, the central control unit determines parameters for CC-SP for the UE to effectively use positioning channel resources (or to perform CC-SP) using CBR-SP measurement information for the positioning channel resources received from the UE and transfer the CC-SP parameters to the UE. Hereinafter, a procedure for performing CCC-SP between the UE and the central control unit and signaling information transmitted and received will be described.

First, the terms related to CCC-SP are defined as follows.

Positioning channel resource: A channel resource pre-allocated for a UE and an AN to perform SL positioning in the NR-V2X system A UE includes a vehicle, a robot, a mobile device, a V2X module, an RSU, an IoT device, etc.

Positioning UE: A UE that performs positioning or intends to perform positioning Neighbor UE: A UE that participates in positioning Non-positioning UE: A UE that does not perform positioning or does not participate in positioning A UE performing CC-SP in an SL positioning procedure may be classified as follows according to a positioning method.

UE performing CC-SP in UE-based SL on-demand RTT positioning: A positioning UE performs a CC-SP function. In contrast, a neighboring UE participating in positioning follows signaling information for CC-SP provided by the positioning UE.

② When a UE reserves a positioning channel resource through a sensing process in UE-assisted SL RTT positioning, a positioning UE may perform CC-SP. Here, a UE performing CC-SP in UE-based SL TDoA positioning is an AN, a neighbor UE participating in positioning performs a CC-SP function. When a UE reserves the positioning channel resource through the sensing process in UE-assisted SL TDoA positioning, the neighbor UE may perform CC-SP.

An SL-PRS includes all PRSs transmitted through SL to measure ToA or ToF between UEs. As an embodiment, an SL-PRS for on-demand RTT positioning between UEs includes a request PRS transmitted by a positioning UE to a neighbor UE and a response PRS transmitted by the neighbor UE to the positioning UE as a response.

SL-PRS comb order: A spacing between subcarriers in which SL-PRSs are transmitted in a comb type-based SL-PRS transmission structure. The spacing between subcarriers in which SL-PRSs are transmitted increases as the SL-PRS comb order increases.

Message packet: A packet that transmits signaling information and data related to a V2X message Positioning packet: A packet that transmits positioning-related signaling information and includes the following packets.

Meanwhile, definitions of the terms related to the DCC-SP method described earlier may equally be applied herein.

Hereinbelow, a CCC-SP method for effectively reducing, with the help/support of the central control unit, issues related to collision between positioning packets, collision between SL-PRSs, and interference between various packets, which may be caused by an increase in the usage of the positioning channel resources in the NR-V2X system, will be proposed. CC-SP parameters will be defined prior to describing a procedure for CCC-SP performed between the UE and the central control unit and transmitted/received signaling information therebetween. In this case, the CC-SP parameters defined below may be transmitted by the UE to the central control unit or by the central control unit to the UE. Some or all of the CC-SP parameters may be transmitted.

Specific parameters related to CC-SP are defined as follows.

Positioning method: CC-SP is performed by changing the positioning method

Positioning packet bitmap: CC-SP is performed by adjusting the usage of channel resources on which a positioning packet is transmitted. In this case, the bitmap may include location information of a logical slot and a subchannel through which the positioning packet is transmitted.

SL-PRS pool bitmap: CC-SP is performed by adjusting the usage of an SL-PRS pool (or channel resources on which an SL-PRS is transmitted). In this case, the bitmap may include location information of a logical slot and a symbol used as the SL-PRS pool.

Positioning packet modulation order: CC-SP is performed by adjusting a transmission modulation order for the signaling information and data of the positioning packet Positioning packet transmission period: CC-SP is performed by adjusting the transmission period of the positioning packet Number of transmissions of positioning packet: CC-SP is performed by adjusting the number of transmissions of the positioning packet Positioning packet dropping: CC-SP is performed by not transmitting the positioning packet reserved for transmission Positioning packet transmission power: CC-SP is performed by adjusting the transmit power of the positioning packet Threshold for positioning UE: A parameter for performing CC-SP by adjusting the number of positioning UEs. The positioning UE does not perform positioning when a PQI or confidence level of an absolute position before positioning is performed is equal to or greater than a certain threshold.

Threshold for neighbor UE: A parameter for performing CC-SP by adjusting the number of neighbor UEs. The neighbor UE participates in TDoA positioning as an AN only when the PQI or confidence level of an absolute location thereof exceeds a certain threshold.

Maximum number of neighbor UEs participating in positioning: CC-SP is performed by adjusting the maximum number of UEs capable of participating in positioning SL-PRS comb order: CC-SP is performed by adjusting the SL-PRS comb order SL-PRS transmission period: CC-SP is performed by adjusting the transmission period of the SL-PRS Number of transmissions of SL-PRS: CC-SP is performed by adjusting the number of transmissions of the SL-PRS SL-PRS dropping: CC-SP is performed by not transmitting the SL-PRS reserved for transmission SL-PRS transmission power: CC-SP is performed by adjusting the transmit power of the SL-PRS Number of repeated transmissions of consecutive SL-PRSs: CC-SP is performed by adjusting the number of repeated transmissions of consecutive SL-PRSs CC-SP through adjustment of the transmit bandwidth of the SL-PRS Next, a proposed procedure for performing CCC-SP by the UE through the central control unit and signaling information transmitted and received will be described. In this case, the UE performing CCC-SP includes a UE that is continuously performing positioning or prepares to perform positioning.

Specifically, in the NR-V2X system, the UE may effectively control the usage of the positioning channel resources with the help/support of the central control unit. The procedure performed between the UE and the central control unit and transmitted/received signaling information are as follows.

The procedure performed for CCC-SP and the transmitted/received signaling information are as follows: (1) The UE transmits a CBR-SP measured for positioning channel resources and request information for CC-SP to the central control unit (Step-1). In this case, the UE may include a positioning UE or a neighbor UE, and the CC-SP request information may include positioning-related parameter information that the UE prefers for performing CC-SP and other status information of the UE. (2) The central control unit determines parameters (or CC-SP parameters) for the UE to effectively perform CC-SP by using and referring to the CBR-SP and the CC-SP request information received from the UE (Step-2). In this case, the CC-SP parameters include a method for adjusting the usage of the positioning channel resources. (3) The central control unit transmits the finally determined CC-SP parameters to the UE (Step-3). (4) The UE performs positioning by applying the CC-SP parameters received from the central control unit (Step-4).

(1) The UE measures the CBR-SP for the positioning channel resource at the request of the central control unit or at the request of an upper layer (e.g., an application layer or a V2X layer) of the UE and transmits the measured CBR-SP together with the CC-SP request information to the central control unit (Step-1). In this case, the CC-SP request information may include CC-SP parameter information that the UE prefers for performing CC-SP and other status information of the UE. The main features of Step-1 are described below.

The UE may include a positioning UE, a neighbor UE, and a non-positioning UE. The non-positioning UE may provide the measured CBR-SP to the central control unit but does not transmit the CC-SP request information.

A method for the UE to report the measured CBR-SP to the central control unit may include periodically reporting the CBR-SP at the request of the central control unit or at the request of the upper layer of the UE, aperiodically reporting the CBR-SP at the request of the central control unit or at the request of the upper layer of the UE, or (periodically or aperiodically) reporting the CBR-SP only when the measured CBR-SP is equal to or greater than a certain threshold or reporting the measured CBR-SP regardless of a threshold.

A CC-SP request information configuration method according to an SL positioning method may be divided into the case in which the UE performs SL RTT positioning and the case in which the UE performs SL TDoA positioning.

In the case in which the UE performs SL RTT positioning, the CC-SP request information may be configured as follows.

The positioning UE that is performing positioning transmits a result of deriving CC-SP parameters using information about a PQI/confidence level of a current absolute position thereof and using information about the CBR-SP within a measured coverage to the central control unit. In this case, the CC-SP parameters transmitted to the central control unit may include all of the CC-SP parameters defined above or only some thereof based on information requested by the upper layer of the UE and the central control unit. The positioning UE preparing for positioning transmits a result of deriving CC-SP parameters capable of minimizing a trade-off between positioning performance to be achieved and the usage of the positioning channel resources to the central control unit, using the CBR-SP information within the measured coverage. In this case, main CC-SP parameters may include parameters related to a positioning execution period and parameters related to the maximum number of neighbor UEs capable of participating in positioning. When receiving the CC-SP parameters from the positioning UE, the neighbor UE may not transmit the CC-SP request information to the central control unit. In this case, the CC-SP parameters from the positioning UE may be transmitted to the neighbor UE through first SCI and/or second SCI of a PSCCH and/or through a PSSCH.

In the case in which the UE performs SL TDoA positioning, the CC-SP request information may be configured as follows.

The neighbor UE that is performing positioning transmits the result of deriving the CC-SP parameters using the PQI/confidence level information of a current absolute position thereof and using the CBR-SP information within the measured coverage, to the central control unit. In this case, the CC-SP parameters transmitted to the central control unit may include all of the CC-SP parameters defined above or only some thereof based on information requested by the upper layer of the UE and the central control unit. The neighbor UE preparing for positioning transmits the result of deriving the CC-SP parameters using the CBR-SP information within the measured coverage to the central control unit.

Next, main status information of the UE may be additionally reported.

Here, the main status information of the UE may include the speed of the UE, a positioning method being performed by the UE or a positioning method that the UE intends to perform, a positioning service being performed by the UE or a positioning service that the UE intends to perform, a current absolute position of the UE, a PQI/confidence level for the absolute position, a PQI/confidence level for the absolute position that the UE intends to achieve, and/or a positioning capability of the UE.

(2) The central control unit determines parameters (or CC-SP parameters) for the UE to effectively perform CC-SP by using and referring to the CBR-SP and the CC-SP request information received from the UE (Step-2).

The central control unit calculates a final CBR-SP for deriving the CC-SP parameters using the CBR-SP received from the UE within coverage. In this case, the CBR-SP used by the central control unit may be calculated through various methods as follows.

Method-1: The final CBR-SP may be calculated in consideration of weights of CBR-SPs received from respective UEs. The weights may be calculated using RSSI and/or RSRP measured using packets received from the UEs.

Method-2: The final CBR-SP may be obtained by calculating the average of the CBR-SPs received from respective UEs.

Method-3: The final CBR-SP may be calculated using a maximum CBR-SP among the CBR-SPs received from respective UEs. In this case, Method-3 may be implemented in combination with Method-1.

(3) The Central Control Unit Transmits the Finally Determined CC-SP Parameters to the UE (Step-3).

Depending on the operation method of the central control unit, the finally calculated CC-SP parameters may be unicast to a UE that has transmitted the CC-SP request information (described above) or broadcast to all UEs within coverage. In this case, the unicast CC-SP parameters may be configured to minimize a trade-off between positioning performance of each UE and the usage of positioning channel resources within coverage, based on the CBR-SP provided by each UE. On the other hand, the broadcast CC-SP parameters may be configured to optimize the usage of the positioning channel resources used by all UEs based on the CBR-SPs provided by in-coverage UEs. In particular, when compared with the unicast CC-SP parameters, the broadcast CC-SP parameters may include a positioning packet bitmap and an SL-PRS pool bitmap.

(4) The UE Performs Positioning by Applying the CC-SP Parameters Received from the Central Control Unit (Step-4).

This method provides the following effects by casing the UE to adjust the usage of the positioning channel resources and perform a positioning procedure with the help of the central control unit. The collision issue between positioning packets, the collision issue between SL-PRSs, and/or the interference issue between various packets, that may occur as the usage of the positioning channel resources of the UE increases and are not solved by CCC designed only for transmission of an existing V2X message, may be effectively reduced.

Congestion Control for NR-V2X Systems with SL Positioning

Hereinafter, a CC method for solving the above-described issues caused by an increase in the usage of the channel resources will be described. The terms used in the present disclosure are defined below.

Message packet with V2X message: A packet that transmits only a V2X message

Here, the V2X message may include data and signaling information for data transmission and reception and include other positioning-related information, such as an absolute position, a relative position, and a PQI that are not directly related to SL-PRS transmission and reception.

Packet with only SL positioning-related signaling information: A packet that transmits only positioning signaling Here, positioning signaling may include positioning-related signaling information for SL-PRS transmission and reception and include other positioning-related information, such as an absolute position, a relative position, and a PQI that are not directly related to SL-PRS transmission and reception. In this case, the positioning signaling may be transmitted through PSCCH SCI (first SCI and/or second SCI) and/or a PSSCH.

Packet with V2X message and SL positioning-related signaling information: A packet that transmits both the V2X message and the positioning signaling Here, the positioning signaling may be transmitted in addition to the PSCCH SCI (first SCI and/or second SCI) and/or the PSSCH that transmit information related to an existing V2X message. As compared with the positioning packet, the message positioning packet transmits a V2X message.

Positioning channel resources: Channel resources allocated for transmission of the message positioning packet and/or the positioning packet and transmission of the SL-PRS among all channel resources allocated to the NR-V2X system V2X channel resources: Channel resources allocated for transmission of the V2X message packet among all channel resources allocated to the NR-V2X system CBR: A value measured for all channel resources allocated to the NR-V2X system CC-V2X: CC (e.g., DCC or CCC) for V2X message communication CC-SP: CC (e.g., DCC or CCC) for SL positioning V2X slot: A logical slot used for transmission of the V2X message in a legacy NR-V2X system SL-PRS slot: A slot differentiated from the V2X slot and newly inserted to transmit only an SL-PRS A CC method for effectively reducing the above-described collision and interference issues between various transmission packets is as follows.

First, positioning signaling and an SL-PRS transmission structure for SL positioning support in the NR-V2X system will be described. The SL positioning signaling may be transmitted through an existing V2X message packet or a positioning packet. An SL-PRS may be transmitted through a symbol which is not used for transmission of a PSFCH of a V2X slot or transmission of a PSCCH/PSSCH/PSFCH in an SL-PRS slot or a V2X slot.

Regarding a method for effectively supporting V2X message communication and SL positioning in the NR-V2X system, positioning may be performed through the following method.

Specifically, when V2X message communication is performed by default in one UE, SL positioning may be performed if a request for SL positioning occurs (Option-1). When V2X message communication is performed by default in one UE, SL positioning may be performed if certain preconfigured/predefined specific conditions are satisfied (Option-2). V2X message communication and SL positioning may not be supported at the same time in one UE (Option-3).

Next, a method for effectively operating CC-V2X and CC-SP using measured CBR information is as follows.

First, the case in which V2X message communication and SL positioning are simultaneously performed in one UE and positioning signaling is transmitted through a V2X message packet may be considered. In this case, according to various preconfigured/predefined processing priorities, applicable or usable methods may include a method of performing CC-V2X and CC-SP, a method of adjusting the (maximum) number of repeated transmissions of an SL-PRS and a positioning signaling operation method according to the (maximum) number of repeated transmissions of a V2X message, a method of adjusting a modulation order of positioning signaling according to a modulation order of the V2X message, a method of performing dropping of positioning signaling and a method of performing dropping of the SL-PRS according to dropping of the V2X message, and a method of adjusting the transmit power of positioning signaling and a method of adjusting the transmit power of the SL-PRS according to the transmit power of the SL-PRS.

Alternatively, V2X message communication and SL positioning may be simultaneously performed in one UE, and positioning signaling may be transmitted through a positioning packet.

Next, preconfiguration conditions are proposed to effectively perform the proposed CC method.

Positioning signaling transmission structure: The message positioning packet or the positioning packet including positioning signaling may be transmitted through positioning signaling transmission structure-1 and positioning signaling transmission structure-2 as follows.

Positioning signaling transmission structure-1 is a structure in which the message positioning packet or the positioning packet is transmitted through arbitrary subchannel(s) in an existing V2X slot. Here, the locations of subchannel(s) in a slot and a transmission slot for the message positioning packet or the positioning packet are not preconfigured and may be arbitrarily selected by the UE or the BS.

Positioning signaling transmission structure-2 is a structure in which the message positioning packet or the positioning packet is transmitted through determined subchannel(s) in an existing V2X message packet transmission slot. The locations of a slot and subchannel(s) for transmitting the message positioning packet or the positioning packet may be preconfigured or be provided via an MIB/SIB from the BS.

Next, the SL-PRS transmission structure may be defined as follows.

The SL-PRS may be transmitted through a PSFCH of an existing V2X slot, transmitted through a symbol not used for PSCCH/PSSCH/PSFCH transmission in a V2X slot, or transmitted through a newly preallocated/preconfigured SL-PRS slot. An SL-PRS pool for transmitting the SL-PRS may be preconfigured through the BS, and a channel resource for SL-PRS transmission in the SL-PRS pool may be preconfigured in association with subchannel(s) in which the message positioning packet or the positioning packet is transmitted or may be arbitrarily selected without preconfiguration. The above SL-PRS transmission structure may be applied to both positioning signaling transmission structure-1 and positioning signaling transmission structure-2 described above.

Alternatively, a logical slot count operation for transmission of the message packet, the message positioning packet, the positioning packet, and the SL-PRS in the NR-V2X system supporting SL positioning is as follows.

Even if the SL-PRS slot is not used for transmission of the message packet, the message positioning packet, and the positioning packet, the SL-PRS slot may be included in the operation of counting all logical slots. A slot count operation may be performed when the SL-PRS slot exists between slots in which the message packet is transmitted. For example, a currently received message packet may be included in a slot position (or a slot number) in which the next message packet is transmitted. In this case, the SL-PRS slot is counted.

Alternatively, when the message positioning packet is transmitted to simultaneously perform V2X message communication and SL positioning in one UE, periodic/aperiodic repeated transmission of the V2X message and positioning signaling through the message positioning packet may be performed as follows.

Specifically, the positioning signaling may be added at the very end of second SCI of a PSCCH. In this case, a starting position and ending position of the positioning signaling may be included in first SCI of the PSCCH. An SCI of the PSCCH may include a destination ID for a UE receiving a V2X message and a destination ID (for SL positioning) for a UE receiving an SL-PRS. In this case, a UE receiving the V2X message and a UE receiving the SL-PRS may be different from each other, and therefore, the two destination IDs may be predefined to be distinguishable from each other.

If the transmission period of the V2X message is shorter than the transmission period of the SL-PRS (or the number (Hz) of repeated transmissions of the V2X message is greater than the number of repeated transmissions of the SL-PRS) so that a plurality of V2X messages is repeatedly transmitted during one transmission period of the SL-PRS, a method for providing the positioning signaling through the V2X message may be performed according to at least one of Method-1, Method-2, or Method-3 as follows.

First, in Method-1, positioning signaling is transmitted through all V2X messages. As a result, positioning signaling detection and decoding performance may be improved. In Method-2, positioning signaling is transmitted only through a V2X message transmitted at the closest time point based on an SL-PRS transmission time point, and positioning signaling is not transmitted through to the remaining V2X messages.

As compared with Method-2, in Method-3, positioning signaling may be transmitted only through a V2X message transmitted at the closest time point based on an SL-PRS transmission time point and a positioning indicator indicating that the UE is performing an SL positioning service may be included in the remaining V2X messages. As a result, the UE receiving a corresponding V2X message may be aware, through the positioning indicator, that the UE performs the SL positioning service and that positioning signaling related to a message to be received later is being transmitted.

Alternatively, when transmitting a message packet and a positioning packet to simultaneously perform V2X message communication and SL positioning in one UE, periodic/aperiodic repeated transmission of positioning signaling through the positioning packet may be performed as follows. Regarding this, the positioning signaling may be transmitted through SCI of a PSSCH and/or through the PSSCH. The message packet and the positioning packet may be simultaneously transmitted in the same slot or in different slots. The transmission period of the V2X message and the transmission period of the positioning signaling (or the transmission period of the message packet and the transmission period of the positioning packet) may be configured independently of each other.

Alternatively, when the positioning packet is transmitted to perform only SL positioning in one UE, the number of periodic/aperiodic repeated transmissions of the positioning packet is the same as the number of periodic/aperiodic repeated transmissions of the SL-PRS.

Next, an operation when there is a request for SL positioning by a BS or an upper layer (e.g., an application layer or a V2X layer) while V2X message communication is being performed may include an operation for performing SL positioning after repeated transmissions are ended when the UE periodically performs repeated transmissions of the message packet.

Alternatively, an operation when there is a request for V2X message communication by the BS or the upper layer while SL positioning is being performed may include an operation for transmitting the V2X message packet after repeated transmissions are ended when the UE periodically performs repeated transmissions of the positioning packet.

Next, a method of measuring a CBR and CR is as follows.

The CBR is measured using all packets (or subchannel(s)) received during a certain observation window from the past time point to the current time point without distinguishing between the message positioning packet and the positioning packet. Information about the measured CBR may be effectively used to resolve overall (or integral) issues related to collision/interference between message positioning packets, collision/interference between positioning packets, and/or collision/interference between the message positioning packet and the positioning packet. Meanwhile, the CR may be measured without distinguishing between the message positioning packet and the positioning packet.

Hereinafter, various methods for effectively supporting V2X message communication and SL positioning in the NR-V2X system will be described.

1) Option-1: V2X message communication in one UE is performed by default. When a request for SL positioning occurs, SL positioning may be performed through the following method.

Specifically, V2X message communication and SL positioning in one UE may be simultaneously performed through the following methods. Method-1 is a method of transmitting both the V2X message and the positioning signaling by transmitting the positioning signaling through the V2X message packet, and Method-2 is a method of transmitting the positioning signaling through the positioning packet and transmitting the V2X message through the message packet.

Alternatively, in order to maintain fairness for use of channel resources between UEs to some extent, channel resources which are being used for V2X message communication may be reduced by adjusting various transmission parameters including the (maximum) number of repeated transmissions of the V2X message and SL positioning may be performed, when priority for V2X message communication of a UE is lower than a specific level or regardless of priority for V2X message communication. A process of performing SL positioning after adjusting the (maximum) number of repeated transmissions of the V2X message may include Step 1 and Step 2 below.

The UE reduces the (maximum) number of repeated transmissions of the V2X message according to the measured CBR or a preconfigured/predefined method (Step-1). In this case, the reduce number of transmissions of the V2X message may vary depending on the type and priority of a V2X communication service, and related details may be preconfigured/predefined. Next, the (maximum) number of repeated transmissions of the SL-PRS is determined based on the adjusted number of repeated transmissions of the V2X message (Step-2). In this case, the (maximum) number of repeated transmissions of the SL-PRS may be preconfigured/predefined in consideration of the number of repeated transmissions of the V2X message, the service type of SL positioning, and positioning accuracy requirements of SL positioning.

Alternatively, when the priority for V2X message communication of the UE exceeds a specific level, SL positioning may be performed without reducing the usage of the channel resources being used. In this case, parameters for SL-PRS transmission and positioning signaling transmission may be configured using preconfigured/predefined parameters based on V2X message parameters.

2) Option-2: V2X message communication in one UE is performed by default, and SL positioning may be performed only when specific conditions are satisfied as in the following embodiment. In other words, a request for SL positioning occurs only when specific preconfigured/predefined conditions are satisfied. Here, positioning signaling may be transmitted through the V2X message packet or the positioning packet as in Option-1.

Alternatively, SL positioning may be performed if the number of repeated transmissions of a message of V2X message communication is less than or equal to a specific threshold. As an embodiment, if V2X message transmission is 20 Hz or less, SL positioning may be performed. However, if the number of repeated transmissions of the V2X message exceeds the specific threshold, SL positioning is not performed.

Alternatively, SL positioning may be performed when the measured CBR for all channel resources is less than or equal to a specific threshold. However, if the measured CBR exceeds the specific threshold, SL positioning is not performed.

3) Option-3: V2X message communication and SL positioning are not supported simultaneously in one UE.

Specifically, SL positioning is not performed when V2X message communication is performed. Alternatively, when SL positioning is performed, V2X message communication is not performed.

Next, various methods for effectively operating CC-V2X and CC-SP using CBR information are described.

When V2X message communication and SL positioning are performed simultaneously in one UE as in Option-1 and Option-2 described above, processing priority between a CC-V2X operation and a CC-SP operation may be preconfigured/predefined as follows.

Specifically, the definition and configuration method of parameters for CC-V2X may be identical or similar to those of CC of the NR-V2X system. Alternatively, the definition and configuration method of parameters for CC-SP may be identical or similar to the definition and configuration method of parameters for CC-V2X.

Alternatively, as a default mode, a parameter configuration and operation for CC-V2X have a higher processing priority than a parameter configuration and operation for CC-SP. Additionally/alternatively, parameters for CC-V2X are preferentially selected/configured, and then parameters for CC-SP are selected/configured. In this case, the parameters for CC-SP may depend on parameter selection/configuration for CC-V2X according to an associated service type, speed of a UE, a target range, priority of a positioning service, and/or a type or characteristic of parameters.

Alternatively, as an exceptional mode, if a positioning performance requirement in a positioning service such as autonomous driving is high, the parameter configuration and operation for CC-SP may have higher processing priority than the parameter configuration and operation for CC-V2X. Alternatively, if the positioning performance requirement in the positioning service such as autonomous driving is high, the parameter configuration and operation for CC-SP may restrict the parameter configuration and operation for CC-V2X.

Hereinafter, a method of adjusting the number of repeated transmissions of the V2X message, the SL-PRS, and the positioning signaling (method of adjusting the first number of transmissions) upon considering Option-1/2 based on the above-described default mode, and a method of dropping the V2X message, the SL-PRS, and the positioning signaling (method of adjusting the second number of transmissions) upon considering Option-1/2 will be described. Here, it is assumed that the positioning signaling is capable of being transmitted through the V2X message packet or the positioning packet.

Method for Adjusting First Number of Transmissions

A method of adjusting the number of repeated transmissions of the V2X message using the measured CBR may be identical or similar to the method of adjusting the number of repeated transmissions of the V2X message described in the legacy NR-V2X system.

Alternatively, in the method of adjusting the number of repeated transmissions of the SL-PRS and the positioning signaling according to the measured CBR level, ① when the measured CBR exceeds a specific threshold, only V2X message transmission is allowed and SL-PRS and positioning signaling transmissions are not allowed, and ② when the measured CBR is in a preconfigured/predefined specific threshold range, V2X message, SL-PRS, and positioning signaling transmissions are allowed and the number of repeated transmissions may be determined based on at least one of determination method 1 and determination method 2 described below.

In determination method 1, the number of repeated transmissions of the SL-PRS should not exceed X % ($0<X<=100$) of the (maximum) number of repeated transmissions of the V2X messages adjusted according to the measured CBR. In this case, a variable "X" may be preconfigured/predefined differently according to the number of repeated transmissions of the V2X message. Next, in determination method 2, the number of repeated transmissions of the SL-PRS may be adjusted regardless of adjustment of the number of repeated transmissions of the V2X message. In this case, the determination method may be identical or similar to the method of adjusting the number of repeated transmissions of the V2X message described in the legacy NR-V2X system.

Alternatively, as a method of adjusting the number of repeated transmissions of the SL-PRS according to the determined CBR level, the (maximum) number of repeated transmissions of the positioning signaling may be determined by the number of repeated transmissions of the V2X message when the positioning signaling is transmitted through the V2X message packet. Alternatively, when the positioning signaling is transmitted through the positioning packet, the number of repeated transmissions of the positioning signaling may be determined as a method similar to or identical to the method used to determine the (maximum) number of repeated transmissions of the SL-PRS.

Method of Adjusting Second Number of Transmissions

First, when the positioning signaling is capable of being transmitted through the V2X message packet, the method of dropping the V2X message may include a first dropping method which is identical or similar to the method of dropping the V2X message described in the legacy NR-V2X system and a second dropping method of dropping V2X messages except for a V2X message transmitted at the closest time point based on an SL-PRS transmission time point in a first dropping condition and/or a second dropping condition.

Here, the first dropping condition is the case in which the transmission period of the V2X message is shorter than the transmission period of the SL-PRS (or the number (Hz) of repeated transmissions of the V2X message is greater than the number of repeated transmissions of the SL-PRS), so that a plurality of V2X messages is repeatedly transmitted during one transmission period of the SL-PRS. The second drop condition is the case in which the number of repeated transmissions of the SL-PRS is incapable of being reduced because an accuracy requirement for SL positioning is high.

Next, the method of dropping the SL-PRS and the positioning signaling is described. Here, dropping for the positioning signaling is performed when dropping for the V2X message occurs. In this case, dropping for the positioning signaling means dropping of the V2X message that transmits the positioning signaling.

Dropping for the SL-PRS may be performed in association with dropping for the positioning signaling. Specifically, when one positioning signal (signaling) is transmitted during one PRS transmission period, the SL-PRS is dropped when the positioning signal is dropped. Alternatively, when a plurality of positioning signals (signaling) is repeatedly transmitted during one transmission period of the SL-PRS, the SL-PRS may not be dropped even if the positioning signaling is dropped.

Unlike the above cases, the method of dropping the V2X message when the positioning signaling may be transmitted through the positioning packet may be identical or similar to the method of dropping the V2X message described in the legacy NR-V2X system. In this case, dropping of the positioning signaling may be performed independently of dropping of the V2X message. Alternatively, dropping of the positioning signaling may be performed in association with dropping of the V2X message. For example, dropping of the positioning signaling may be performed at a ratio of Y % of the number of times of dropping of the V2X message. In addition, dropping of the SL-PRS is performed when dropping of the positioning signaling occurs.

Next, a method of adjusting a modulation order of the V2X message and the positioning signaling based on a default mode and Option-1/2 described above will be described in detail.

The modulation order of the V2X message may be adjusted when the positioning signaling is capable of being transmitted through the V2X message packet (Case 1). Specifically, the method of adjusting the modulation order of the V2X message may be configured using an identical or similar method to the method of adjusting the modulation order of the V2X message described in the legacy NR-V2X system. The method of adjusting the modulation order of the positioning signaling may be configured to be identical to the method of adjusting the modulation order of the V2X message.

Alternatively, the modulation order of the V2X message may be adjusted when the positioning signaling is capable of being transmitted through the positioning packet. Specifically, the method of adjusting the modulation order of the V2X message may be configured using an identical or similar method to the method of adjusting the modulation order of the V2X message described in the legacy NR-V2X system. In addition, the method of adjusting the modulation order of the positioning signaling may be configured identically to or independently of the method of adjusting the modulation order of the V2X message.

Next, a method of adjusting the transmit power of the V2X message and the positioning signaling based on a default mode according to Option-1/2 described above will be described in detail.

When the positioning signaling is transmitted through the V2X message packet, the transmit power of a signal related to positioning may be adjusted as follows. Specifically, the transmit power for the V2X message may be configured using an identical or similar method to the method of adjusting the transmit power of the V2X message described in the legacy NR-V2X system. The transmit power of the positioning signaling may be configured to be equal to the transmit power of the V2X message. The transmit power of the SL-PRS may be configured using an identical or similar method to the method of adjusting the transmit power of the V2X message described in the legacy NR-V2X system.

When the positioning signaling is transmitted through the positioning packet, the transmit power of a signal related to positioning may be adjusted as follows. Specifically, the transmit power of the V2X message may be configured using an identical or similar method to the method of adjusting the transmit power of the V2X message described in the legacy NR-V2X system. Alternatively, the transmit power for the positioning signaling may be configured to be identical to or independent of the transmit power of the V2X message. Alternatively, the transmit power of the SL-PRS may be configured using an identical or similar method to the method of adjusting the transmit power of the V2X message described in the legacy NR-V2X system.

Since the CC described in the legacy NR-V2X system only considers V2X message communication, CC is restrictive in terms of use and performance in the NR-V2X system supporting both V2X message communication and SL positioning. To solve this problem, various CCs for effectively adjusting the usage of channel resources in the NR-V2X system supporting V2X message communication and SL positioning may be applied. In this case, the following advantages may be provided.

First, according to the three options proposed to support V2X message communication and SL positioning in the NR-V2X system, when the UE simultaneously performs V2X message communication and SL positioning, V2X channel resources and SL positioning channel resources may be appropriately distributed according to a preconfigured/predefined method. The proposed three options may provide fairness in use of channel resources between UEs and effectively reduce collision/interference issues between various transmission packets.

In addition, the CC using the measured CBR information for all channel resources proposed above may, as a whole (or collectively), reduce collision/interference between message positioning packets, collision/interference between positioning packets, and/or collision/interference between the message positioning packet and the positioning packet.

In addition, the proposed method of operating CC-V2X and CC-SP based on the preconfigured/predefined processing priority may preferentially perform CC-V2X and perform CC-SP based on determined parameter information. In this case, when the UE simultaneously performs V2X message communication and SL positioning, the proposed method of operating CC-V2X and CC-SP based on the preconfigured/predefined processing priority may provide 1)

excellent compatibility since the CC method used in the legacy NR-V2X system may be used and 2) simple processing since parameters for CC-SP are determined based on the parameter information calculated/determined for CC-V2X.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 14:
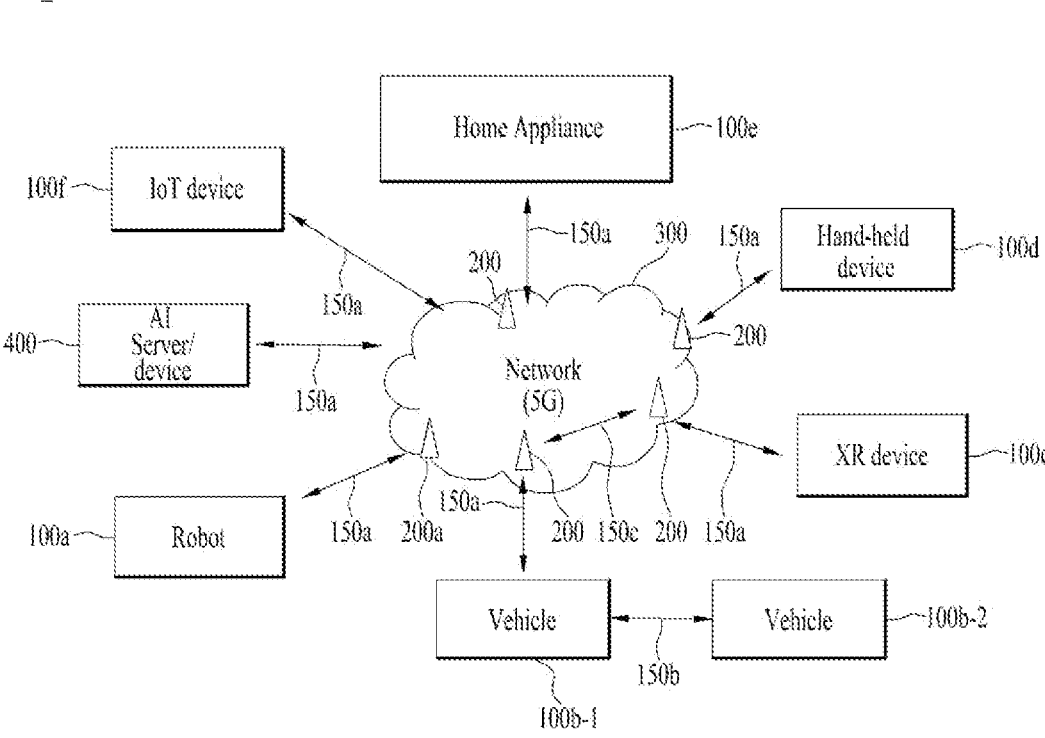
FIG. 14 illustrates a communication system applied to the present disclosure.

FIG. 14 illustrates a communication system applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e g, channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 15:
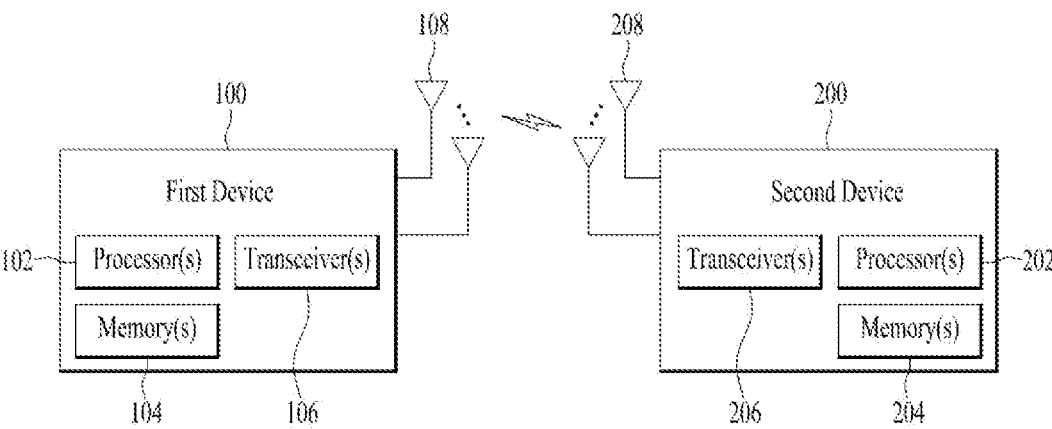
FIG. 15 illustrates wireless devices applicable to the present disclosure.

FIG. 15 illustrates a wireless device applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include the processor(s) 102 and the memory(s) 104 connected to the RF transceiver(s). The memory(s) 104 may include at least one program capable of performing an operation related to the embodiments described with reference to FIGS. 11 to 13.

The processor(s) 102 may measure a CBR in a resource region preconfigured to perform positioning, and control the RF transceiver(s) to transmit a positioning packet including scheduling information about a PRS and transmit the PRS to neighbor UEs based on the scheduling information. The positioning packet may include a first threshold related to a confidence level or a PQI of an absolute position for specifying a neighbor UE which is to transmit a response PRS in response to the PRS, and the first threshold may be determined based on the CBR.

Alternatively, a chipset including the processor(s) 102 and the memory(s) 104 may be configured. In this case, the chipset may include at least one processor, and at least one memory operably connected to the at least one processor and causing, when executed, the at least one processor to perform an operation. The operation may include measuring a CBR in a resource region preconfigured to perform positioning, transmitting a positioning packet including scheduling information about a PRS, and transmitting the PRS to neighbor UEs based on the scheduling information. The positioning packet may include a first threshold related to a confidence level or a PQI of an absolute position for specifying a neighbor UE which is to transmit a response PRS in response to the PRS, and the first threshold may be determined based on the CBR. The above operation may perform operations for transmitting the PRS according to the embodiments described with reference to FIGS. 11 to 13 based on the program included in the memory(s) 104.

Alternatively, a computer readable storage medium including at least one computer program that causes at least the at least one processor to perform an operation is provided. The operation may include measuring a CBR in a resource region preconfigured to perform positioning, transmitting a positioning packet including scheduling information about a PRS, and transmitting the PRS to neighbor UEs based on the scheduling information. The positioning packet may include a first threshold related to a confidence level or a PQI of an absolute position for specifying a neighbor UE which is to transmit a response PRS in response to the PRS, and the first threshold may be determined based on the CBR. The above operation may perform operations for transmitting the PRS according to the embodiments described with reference to FIGS. 11 to 13 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Alternatively, the processor(s) may control the RF transceiver(s) to receive a positioning packet including scheduling information about a PRS in a resource region preconfigured to perform positioning and receive the PRS based on the positioning packet, and determine whether to transmit a response PRS in response to the PRS, based on the positioning packet. The positioning packet may include a first threshold determined based on a CBR measured in the resource region, and the response PRS may be transmitted based on a confidence level or a positioning quality indicator (PQI) of an absolute position of the second UE which is equal to or greater than the first threshold. The above operation may perform operations for receiving the PRS according to the embodiments described with reference to FIGS. 11 to 13 based on a program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 16:
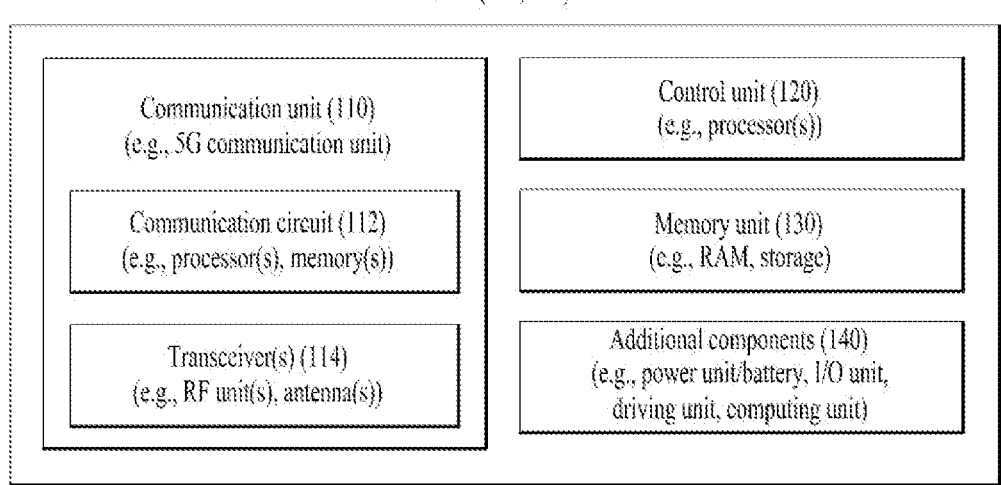
FIG. 16 illustrates another example of a wireless device to which the present disclosure is applied. The wireless device may be implemented in various forms according to use—examples/services.

FIG. 16 illustrates another example of a wireless device applied to the present disclosure. The wireless device may be implemented in various forms according to a use-case/service (refer to FIG. 14)

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use—example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
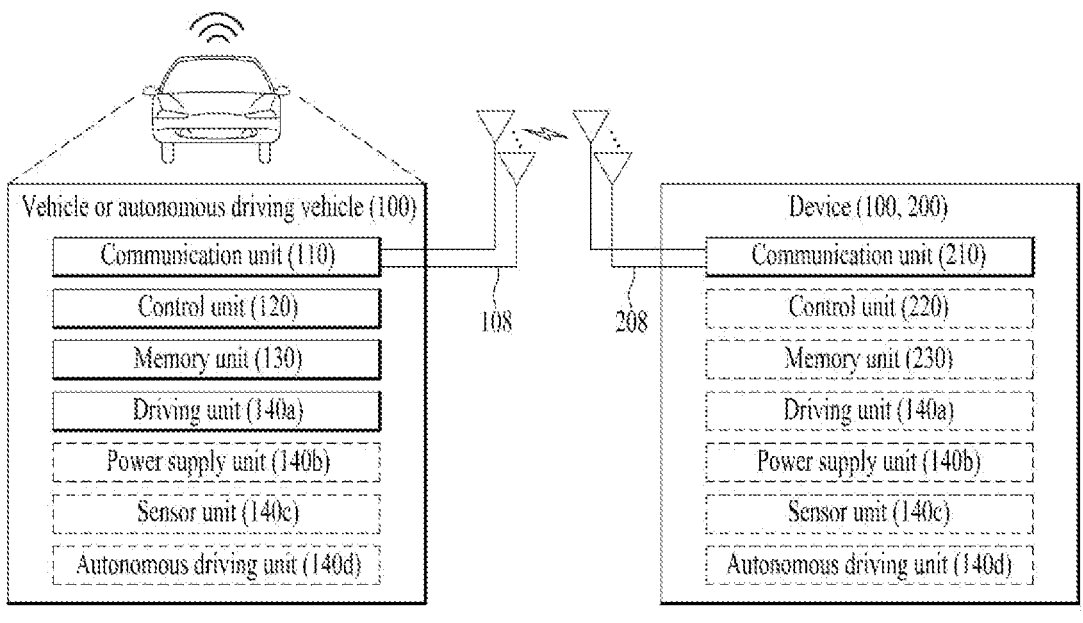
FIG. 17 illustrates a vehicle or an autonomous driving vehicle applied to the present disclosure.

Examples of Vehicles or Autonomous Vehicles to which the Present Disclosure is Applied FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method by a first user equipment (UE) comprising:
   receiving configuration information related to a direct communication between UEs,
   wherein the configuration information includes information on a resource pool for a positioning reference signal (PRS);
   measuring a channel busy ratio (CBR) based on the resource pool for the PRS;
   transmitting scheduling information for scheduling a transmission of the PRS in the resource pool;
   transmitting a first PRS to neighboring UEs based on the scheduling information;
   receiving at least one second PRS from at least one neighboring UE among the neighboring UEs; and
   performing positioning based on the at least one second PRS,
   wherein the scheduling information further includes a first threshold for specifying the at least one neighboring UE that is to transmit the at least one second PRS as at least one Anchor Node (AN) for the positioning,
   wherein the first threshold is a value for a confidence level of an absolute position or a positioning quality indicator (PQI) determined based on the CBR, and wherein the at least one second PRS is received through a feedback channel related to the scheduling information.

2. The method of claim 1, wherein the first UE receives the at least one second PRS from the at least one neighboring UE having the confidence level of the absolute position or the PQI which is equal to or greater than the first threshold.

3. The method of claim 1, wherein the first UE increases the first threshold in response to an increase in the CBR.

4. The method of claim 1, wherein the first UE determines a second threshold based on the CBR, and wherein the first UE transmits the scheduling information based on the confidence level of the absolute position of the first UE or the PQI of the first UE which is less than the second threshold.

5. The method of claim 1, wherein the first UE determines a second threshold based on the CBR, and wherein the first UE drops transmission of the scheduling information based on the confidence level of the absolute position of the first UE or the PQI of the first UE, which is equal to or greater than the second threshold.

6. The method of claim 1, wherein the first UE determines a PRS pattern for the first PRS based on the CBR.

7. The method of claim 1, further comprising determining a transmission parameter for the first PRS based on the CBR, wherein the transmission parameter includes at least one of a modulation and coding scheme (MCS), a transmission period, the number of repeated transmissions, and a transmit power.

8. The method of claim 1, wherein the resource pool includes a first resource region configured to transmit the resource pool and a second resource region configured to transmit the first PRS.

9. The method of claim 8, wherein the first UE measures a first CBR for the first resource region and a second CBR for the second resource region and determines a larger of the first CBR and the second CBR as the CBR.

10. A method by a second user equipment (UE) comprising:

receiving configuration information related to a direct communication between UEs, wherein the configuration information includes information on a resource pool for a positioning reference signal (PRS);

receiving scheduling information for scheduling a transmission of the PRS in the resource pool;

receiving a first PRS based on the scheduling information; and determining whether to transmit a second PRS in response to the PRS, based on the scheduling information, wherein the scheduling information further includes a first threshold for specifying neighboring UE that is to transmit the second PRS as an Anchor Node (AN) for the positioning, and wherein the second UE transmits the second PRS to the first UE as the AN for positioning the first UE based on a confidence level of an absolute position of the second UE or a positioning quality indicator (PQI) of the second UE which is equal to or greater than the first threshold, and wherein the second PRS is transmitted through a feedback channel related to the scheduling information.

11. A first user equipment (UE) comprising:
a radio frequency (RF) transceiver; and
a processor connected to the RF transceiver,
wherein the processor is configured to:
receiving configuration information related to a direct communication between UEs, wherein the configuration information includes information on a resource pool for a positioning reference signal (PRS);
measure a channel busy ratio (CBR) based on the resource pool for the PRS;
control the RF transceiver to transmit scheduling information for scheduling a transmission of the PRS in the resource pool;
transmit a first PRS to neighboring UEs based on the scheduling information,
receive at least one second PRS from at least one neighboring UE among the neighboring UEs; and
perform positioning based on the at least one second PRS,
wherein the scheduling information further includes a first threshold for specifying the at least one neighboring UE that is to transmit the at least one second PRS as at least one Anchor Node (AN) for the positioning,
wherein the first threshold is a value for a confidence level of an absolute position or a positioning quality indicator (PQI) determined based on the CBR, and
wherein the at least one second PRS is received through a feedback channel related to the scheduling information.

\* \* \* \* \*